(12) United States Patent
Mihara

(10) Patent No.: US 6,517,211 B2
(45) Date of Patent: Feb. 11, 2003

(54) ILLUMINATION DEVICE FOR PROJECTION-TYPE DISPLAY AND PROJECTION-TYPE DISPLAY APPARATUS

(75) Inventor: Hisayuki Mihara, Kodama-gun (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 09/929,342

(22) Filed: Aug. 15, 2001

(65) Prior Publication Data
US 2002/0030793 A1 Mar. 14, 2002

(30) Foreign Application Priority Data
Aug. 29, 2000 (JP) .......................... 2000-259541

(51) Int. Cl.$^7$ .................... G03B 21/28; G03B 21/00; G03B 21/26
(52) U.S. Cl. .................. 353/98; 353/31; 353/37; 353/99; 353/122
(58) Field of Search .................. 353/1, 2, 31, 37, 353/38, 81–83, 122, 50, 51, 121, 39, 48, 85–87, 94, 98, 99; 348/771, 774, 804, 806; 345/32, 31, 58; 359/567, 616, 617, 558, 559, 615

(56) References Cited

U.S. PATENT DOCUMENTS 4,384,769 A * 5/1983 Brei et al. .................. 348/188
6,260,974 B1 * 7/2001 Koyama ..................... 353/102

FOREIGN PATENT DOCUMENTS

JP 2000-155545 * 6/2000 .......... G09F/13/28

OTHER PUBLICATIONS

Merriam–Webster's Collegiate Dictionary, 2001, Merriam–Webster, 10th eddition, pp. 672 and 636.*

* cited by examiner

Primary Examiner—Russell Adams
Assistant Examiner—Andrew Sever
(74) Attorney, Agent, or Firm—Pillsbury Winthrop LLP

(57) ABSTRACT

The illumination device has a simple structure and a small size, can obtain a sufficient illumination light amount, and can improve illumination ability, with high reliability and high performance at low costs. A kaleidoscope is arranged such that its center axis substantially corresponds to the optical axis of a light bulb. The kaleidoscope includes a diffusive reflection surface in its rear side, and a laser beam is irradiated on the diffusive reflection surface from the opening side of the kaleidoscope, so that reflection light from the diffusive reflection surface is used as at illumination light source.

23 Claims, 22 Drawing Sheets

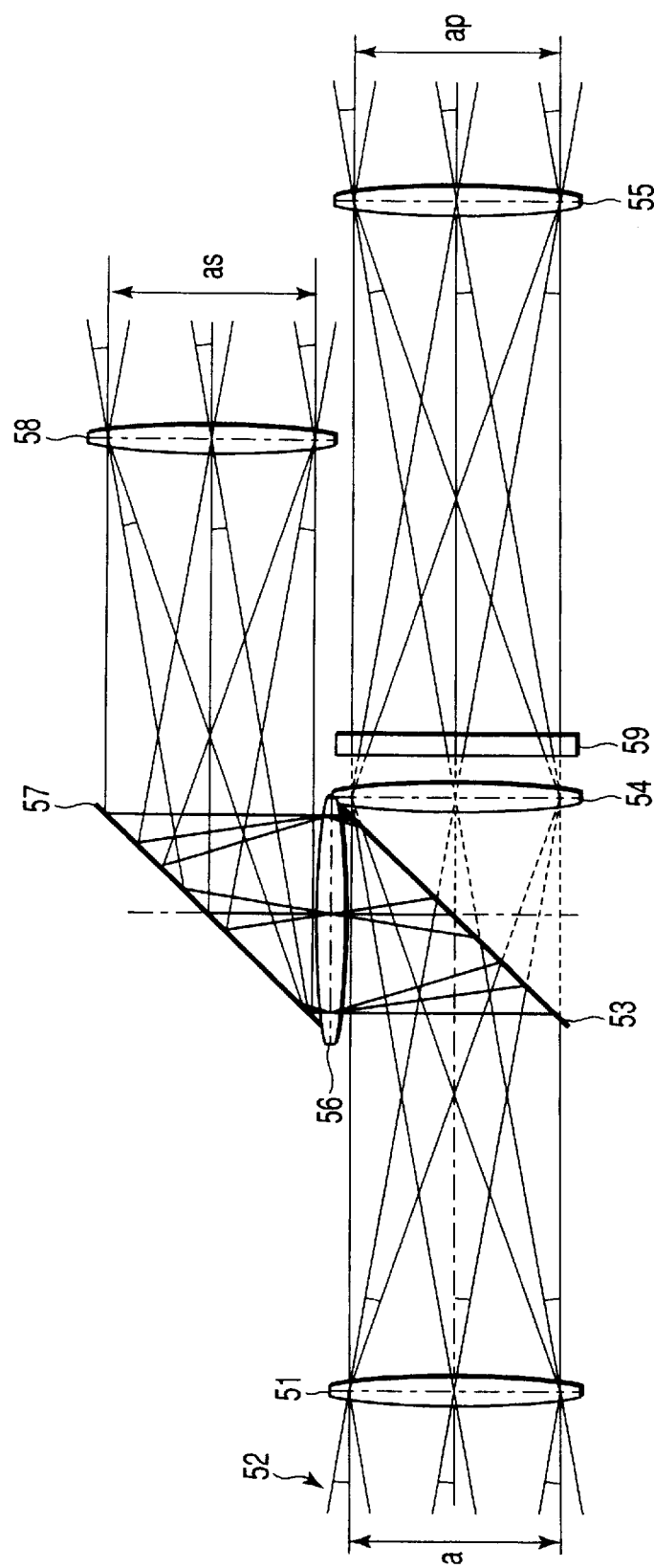
F I G. 11

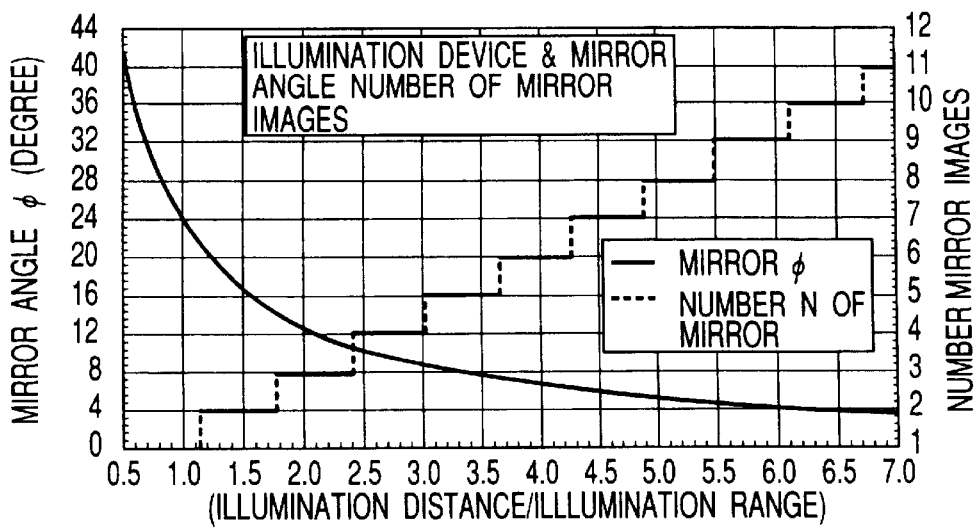
F I G. 14A
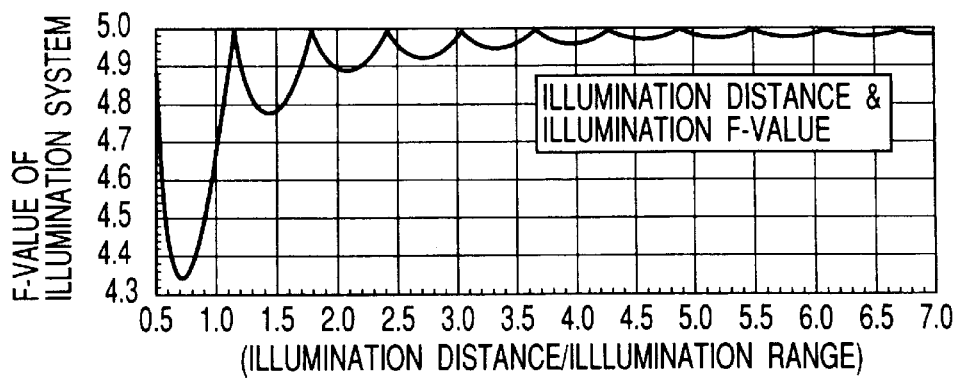
F I G. 14B
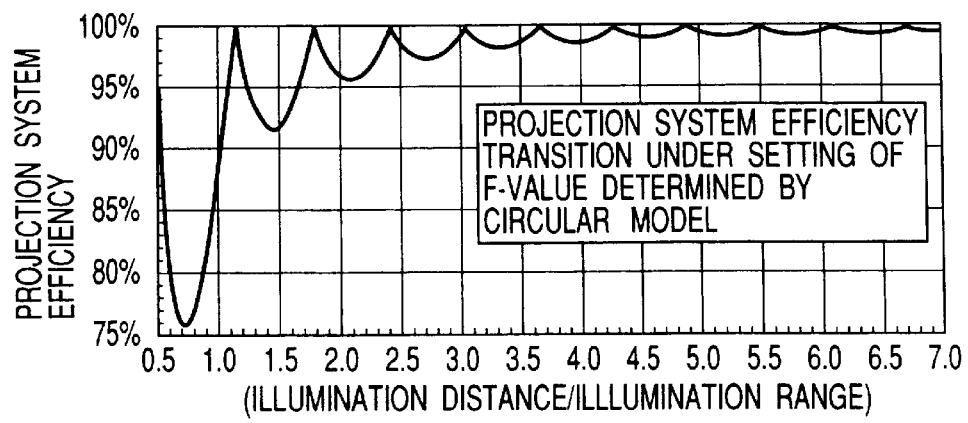
F I G. 14C

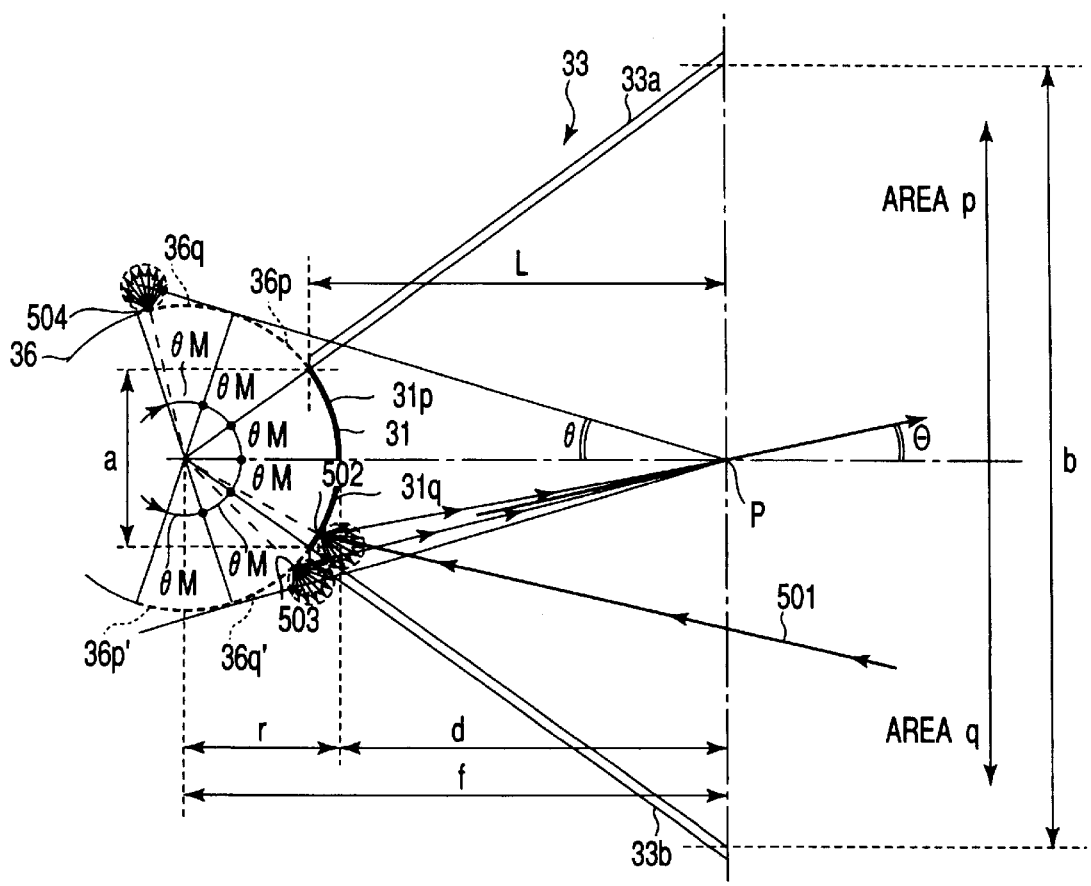
F I G. 21

ILLUMINATION DEVICE FOR PROJECTION-TYPE DISPLAY AND PROJECTION-TYPE DISPLAY APPARATUS

CROSS-REFERENCE TO RELATED APPLICATIONS

This application is based upon and claims the benefit of priority from the prior Japanese Patent Application No. 2000-259541, filed Aug. 29, 2000, the entire contents of which are incorporated herein by reference.

BACKGROUND

The inventions described herein relate to an illumination device for a projection-type display and a projection-type display apparatus, which use efficiently a light integrator.

It is a conventional trend to use discharge lamps such as mercury lamps, metal halide lamps, or xenon lamps as light sources of projection-type displays.

However, a light source based on a lamp contains many unnecessary light components which are cut by an optical filter such as a UV filter, an IR filter, a dichroic mirror, or the like in the projection-type display generally utilizing optical driving based on three primary colors. As a result, this involves factors which do not only cause increase in costs but also cause various drawbacks due to stray light and heat generation.

Optical semiconductor elements such as LEDs and the like may be cited as new candidates for light sources which will substitute those light sources that have been described above. For example, an InGaAlP (red) LED 1 element has a forward voltage of about 2 V, by the standards, in normal use at 20 mA, and the electric power of the light source is only 0.04 W. A large number of such light sources are required for a projection-type display light source. Further, these semiconductor elements have drawbacks of a large light diffusion angle, a high refraction factor, and an inferior transmittance to the air. To overcome these drawbacks, it may be considered that a reflector should be provided in the side opposite to the side of the irradiation surface and the lamp element surface should be covered with resin material or the like having a lens-like shape, to improve the directivity and the light extraction efficiency, as can be seen in a normal single LED lamp structure.

However, in this structure, the shape of the light source has a large size in case where a large number of single LED lamps are provided, so that the system is enlarged much and the costs increase. In addition, in case of using liquid crystal for light valves, for example, the illumination angle becomes so large that the video quality including contrast and the like is lowered due to influences from the view field. Many drawbacks have hence been involved, e.g., it is very difficult to construct an optical system including a projection lens member, which achieves light condensation with high efficiency.

As described above, a conventional projection-type display has a light source having a large size. The number of parts increases, complicating the structure. Another problem exists in that the light amount is insufficient when LEDs are used.

SUMMARY

The inventions described herein provide an illumination device for a projection-type display and a display apparatus, each of which has a simple structure and a small size and can obtain a sufficient illumination amount.

The inventions also provide an illumination device for a projection-type display, which has improved illumination ability and high reliability.

The inventions also provide an illumination device for a projection-type display with high performance at low costs.

An illumination device according to the present invention comprises: a light integrator having an irradiation surface opposed to a light valve and positioned in a side of light incidence part of the light valve such that a center axis of the irradiation surface substantially corresponds to an optical axis of the light bulb, a diffusive reflection surface arranged at an interval from the irradiation surface, and a reflection mirror surrounding a space between the irradiation surface and the diffusive reflection surface, the light integrator having a cross-sectional area larger than the diffusive reflection surface at any position in the center axis direction; and a light source having light guide means for guiding light toward the diffusive reflection surface in the light integrator.

A projection-type display apparatus according to the present invention comprises: a light valve; a light integrator having an irradiation surface opposed to the light valve and positioned in a side of light incidence part of the light valve such that a center axis of the irradiation surface substantially corresponds to an optical axis of the light valve, a diffusive reflection surface arranged at an interval from the irradiation surface, and a reflection mirror surrounding a space between the irradiation surface and the diffusive reflection surface, the light integrator having a cross-sectional area larger than the diffusive reflection surface at any position in the center axis direction; and light guide means for irradiating a laser beam toward the diffusive reflection surface in the light integrator.

A distance Ls between the diffusive reflection surface and the light emission part of the light guide means is expressed by a function using at least a as a reflection area of the diffusive reflection surface, b as an area of a light valve illumination setting range depending on the irradiation surface, d as a distance from the diffusive reflection surface to the irradiation surface, and $\Delta\theta$ as an insertion angle of the light guide means at a position where the light guide means is inserted in the light integrator.

The diffusive reflection surface is formed in a convex shape having a curvature.

The diffusive reflection surface is formed in a convex shape having a curvature, and the distance Ls between the diffusive reflection surface and the light emission part of the light guide means is expressed by a function using at least a as a reflection area of the diffusive reflection surface, b as an area of a light valve illumination setting range depending on the irradiation surface, d as a distance from the diffusive reflection surface to the irradiation surface, and $\Delta\theta$ as an insertion angle of the light guide means at a position where the light guide means is inserted in the light integrator.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter

BRIEF DESCRIPTION OF OF THE DRAWINGS

The accompanying drawings, which are incorporated in and constitute a part of the specification, illustrate various embodiments of the invention, and together with the general description given above and the detailed description of the embodiments given below, serve to explain the principles of the invention.

FIG. 11 is a view showing a basic structure of another embodiment of the inventions;

FIGS. 14A to 14C are explanatory views as graphs which show influence from the shade described above in an arbitrary cross-section (a cross-section perpendicular to the optical axis direction inside the light integrator) including the optical axis under an arbitrary illumination condition;

FIG. 21 is a view for explaining also an example of a design condition of the inventions;

Figure 22:
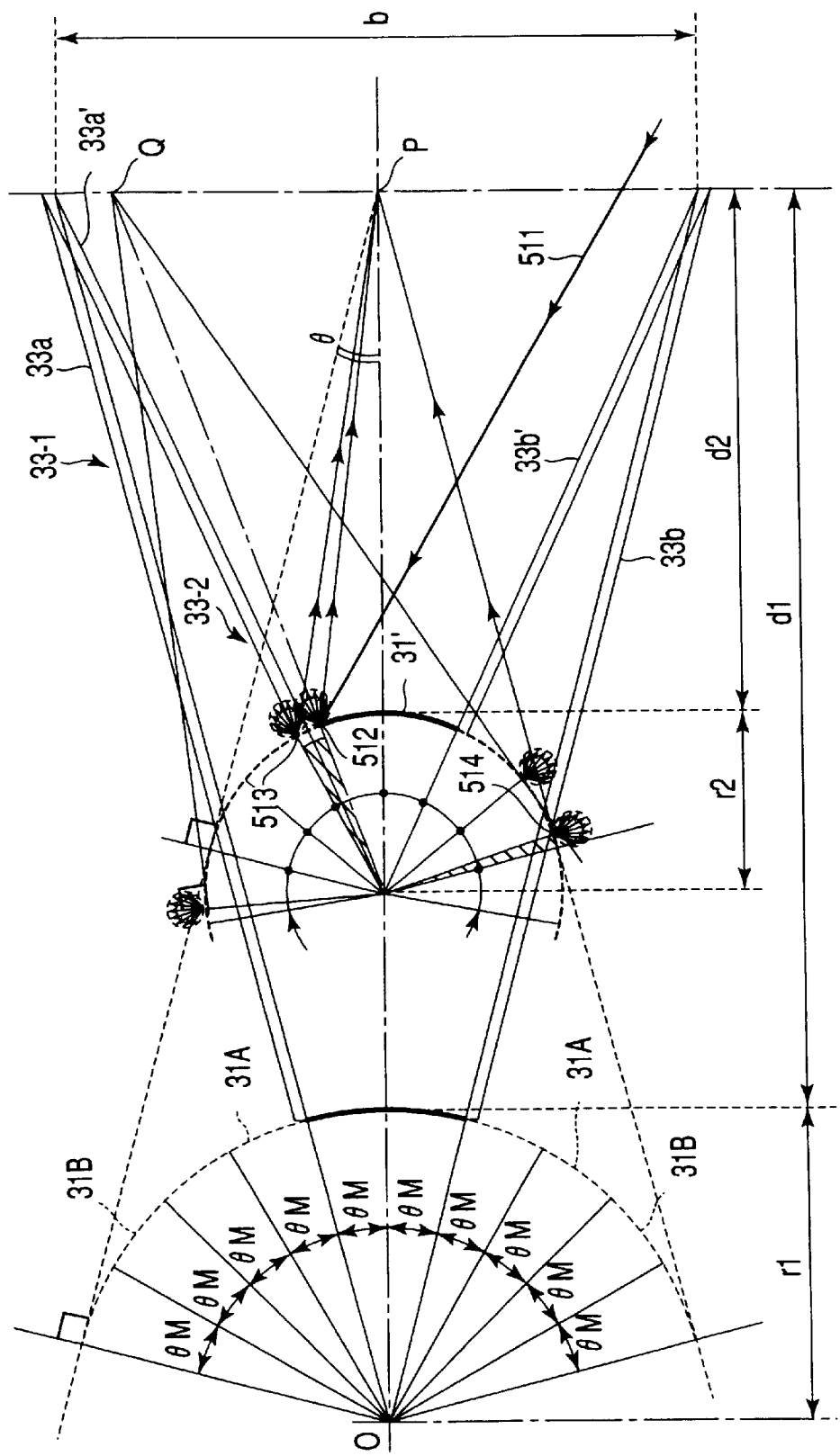
Figure 23:
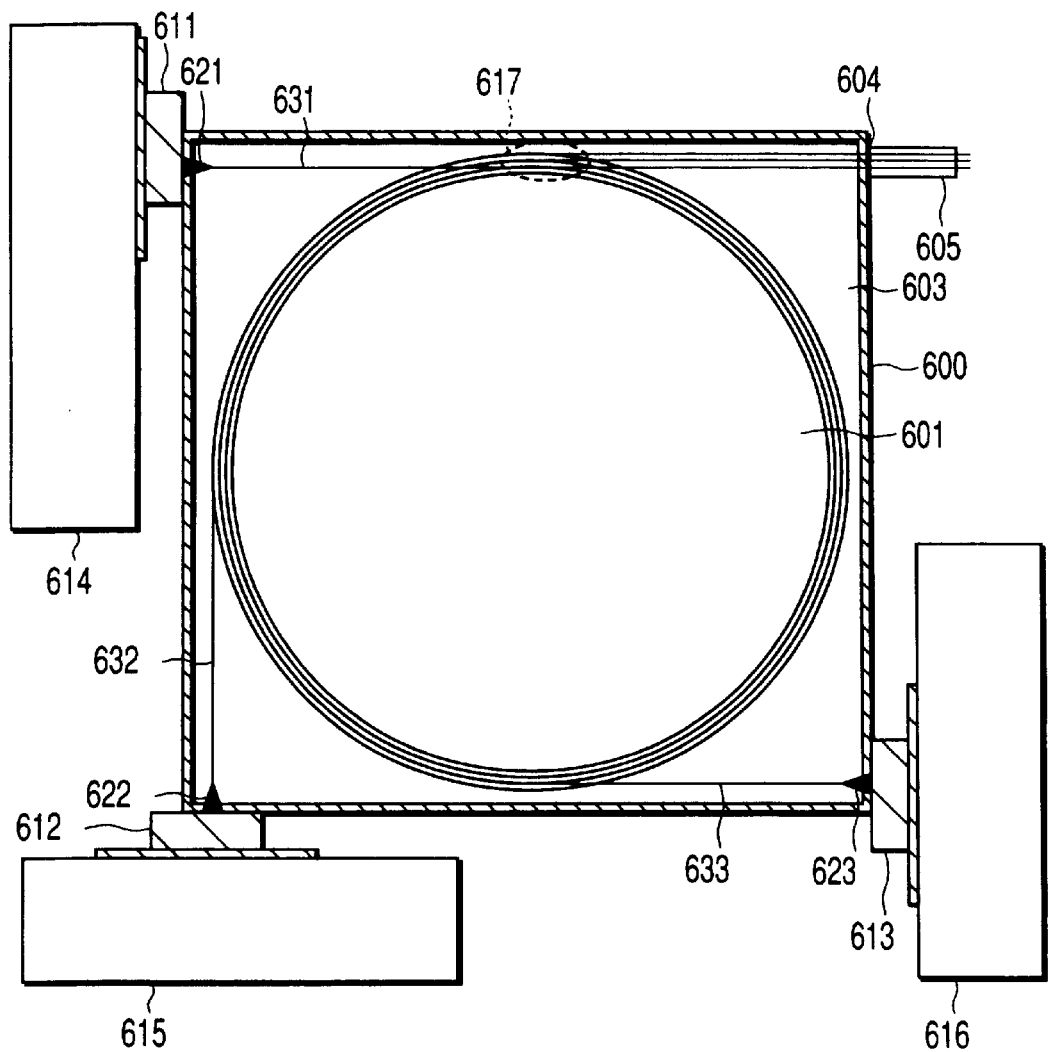
Figures 24A, 24B, 24C, 24D:
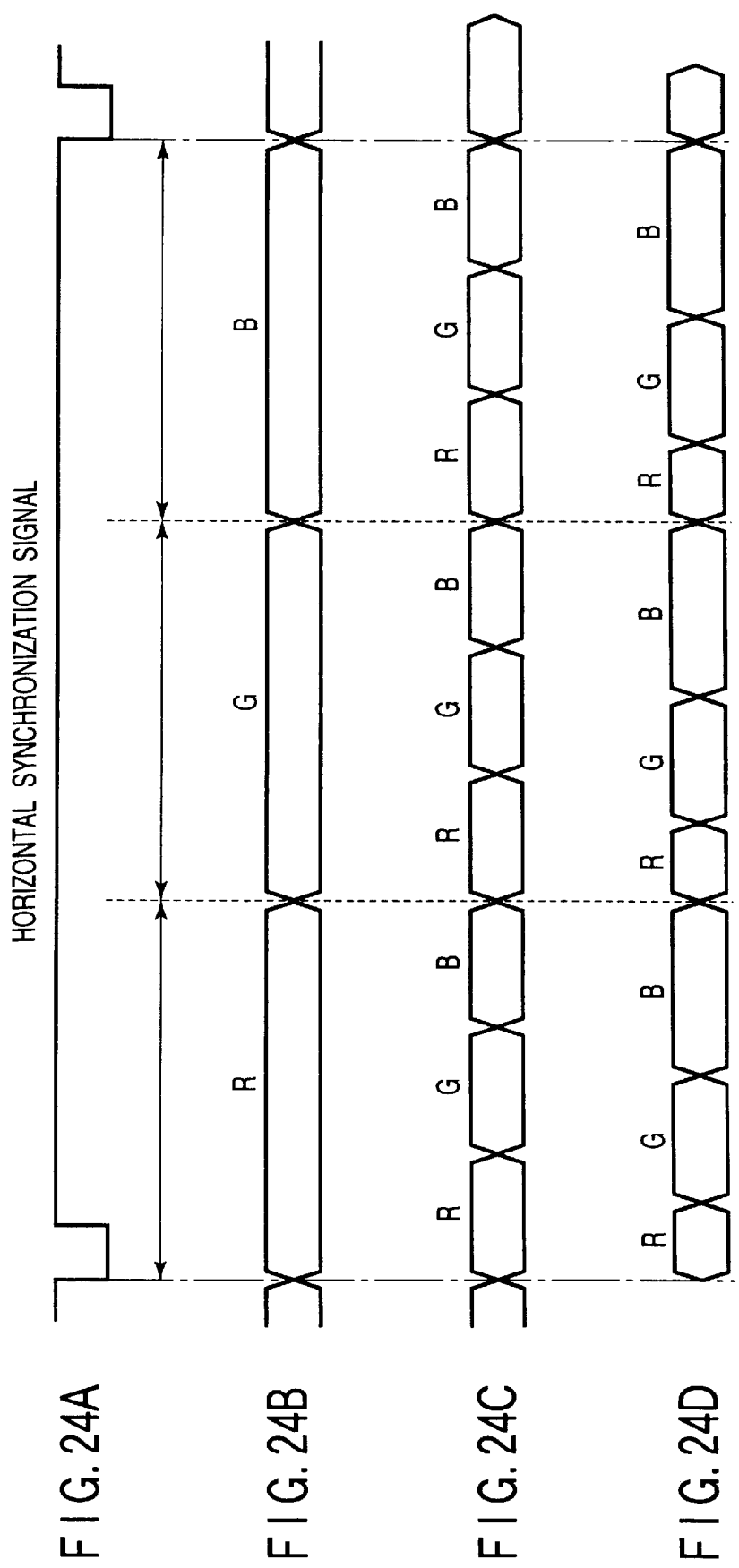
Figure 25:
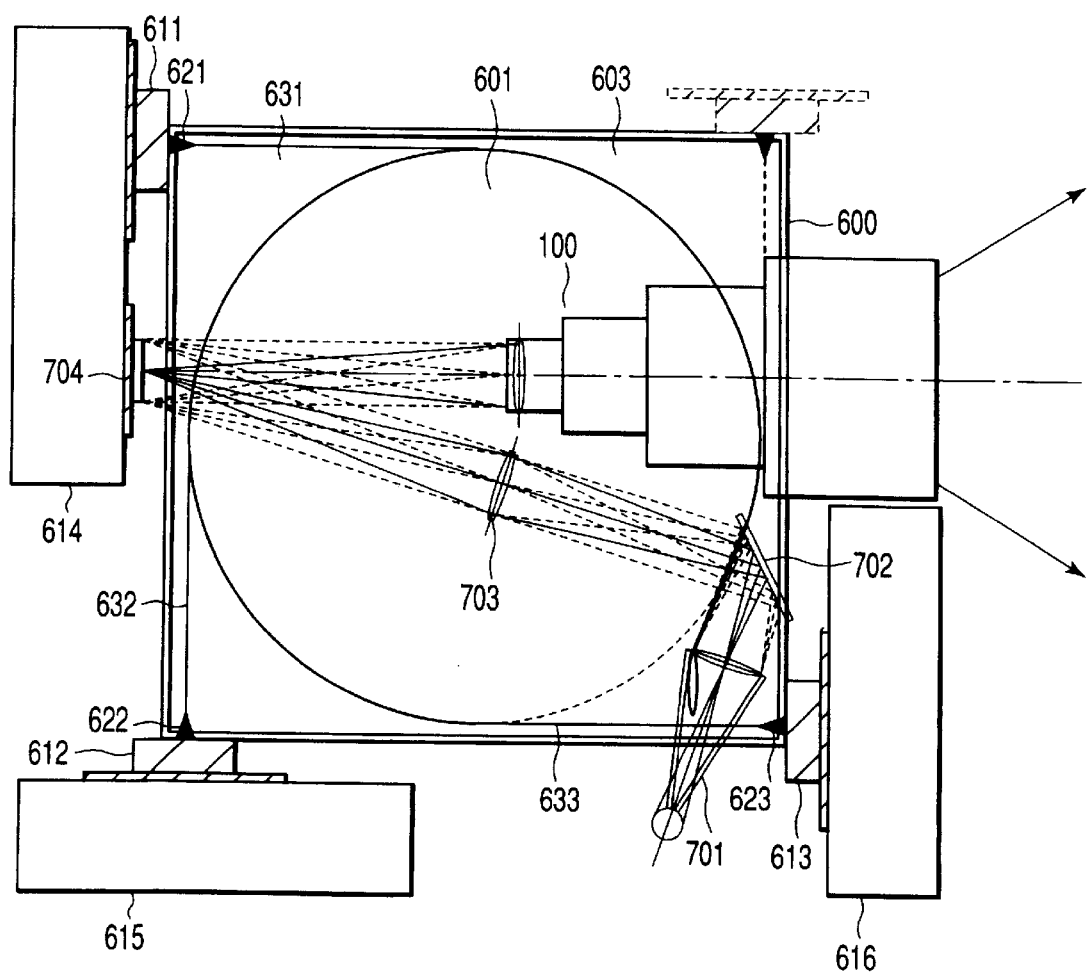

FIG. 22 a view for explaining also an example of a design condition of the inventions;

FIG. 23 is a view showing a basic structural example of a projection-type display apparatus according to the inventions;

FIGS. 24A to 24D are explanatory views for an example of driving of a laser light-emission device and an example of driving of a spatial modulation element; and FIG. 25 is a view showing a state where a light integrator, DMD (spatial modulation element), and projection lens member are added to the device shown in FIG. 23.

DETAILED DESCRIPTION

In the following, embodiments of the inventions will be explained with reference to the drawings.

Figure 1:
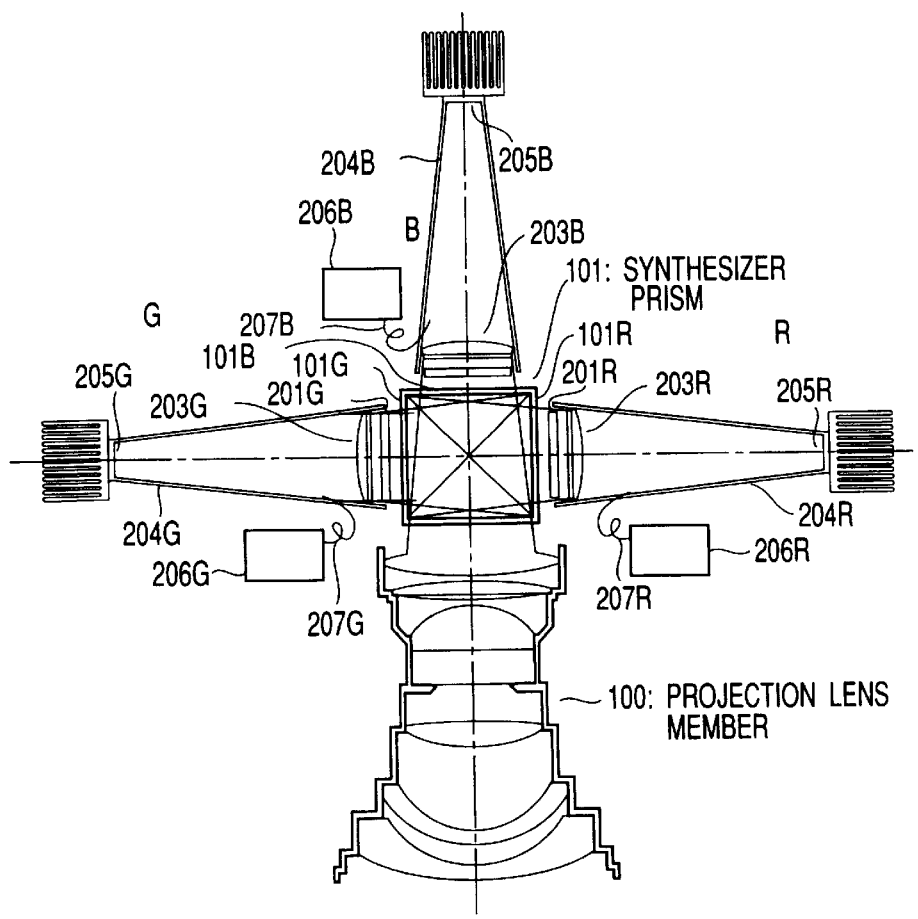
FIG. 1 is a structural explanatory view showing an example of a projection-type display apparatus according to the present invention.

FIG. 1 shows a simplified entire structure of a projection-type display apparatus to which the inventions is applied. The reference 100 denotes a projection lens member into which RGB-synthesized (Red, Green, and Blue) video light enters from an emission surface of a synthesizer prism 101 whose substantial outer appearance has a cube-like shape.

In the side of a side surface 101R of the synthesizer prism 101, a light valve 201R is provided in parallel with this side surface. The light valve 201R is supplied with a video signal corresponding to red as a displayed color. Illumination light is irradiated on the light valve 201R through a convergence lens 203R provided at an opening part (irradiated surface) of the light integrator 204R. A diffusive reflection surface 205R is provided at another end of the light integrator 204R. A laser beam from a laser source 206R is guided internally to the light integrator 204R through a light guide means (e.g., an optical fiber or cable). Light emitted from an end part of the light guide means 206R is irradiated on the diffusive reflection surface 205R. The specific structure and various conditions of this part will be described later.

In the side of the side surface 101G of the synthesizer prism 101, a light valve 201G is provided in parallel with this side surface. The light valve 201G is irradiated with light from a light integrator 204G having the same structure as the light integrator 204R described above. Accordingly, similar references to those denoted to the parts in the side of the light valve 201R will also be denoted to the parts in the side of the light valve 201G, and detailed explanation thereof will be omitted herefrom. The side surface 101B of the synthesizer prism 101 described above is provided with a light valve 201B similar to the bulbs described above, a convergence lens 203B, a light integrator 204B, and the like. Therefore, similar references as those denoted to the parts in the side of the light valve 201R will be also denoted to the parts in the side of the bulb 201B, and detailed explanation thereof will be omitted herefrom.

The light valves 201R, 201G, and 201B are liquid crystal display elements of a transmissible type. Also, the diffusive reflection surfaces 205R, 205G, and 205B are reflection surfaces that have a perfect-diffusion characteristic or a close diffusion characteristic. A heat radiation plate may be attached to the back side of each of the diffusive reflection surfaces 205R, 205G, and 205B.

According to the inventions, a LED may be used for the light source described above. In this case, the part of the diffusive reflection surface is replaced with a LED light emission substrate.

Figure 2:
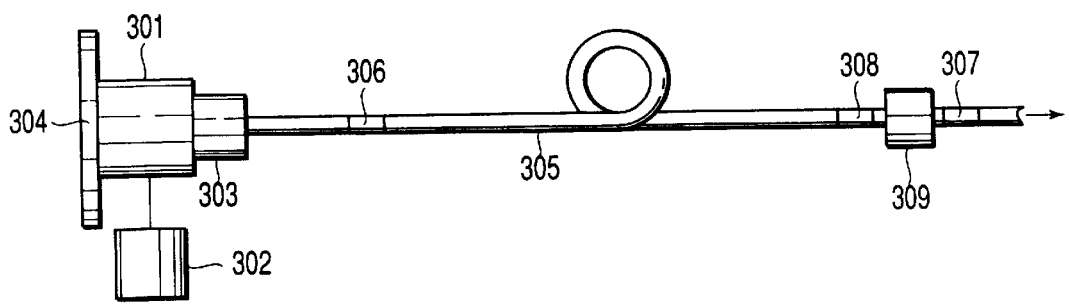
FIG. 2 is an explanatory view for a structural example of an induced-emission light source.

FIG. 2 shows a structural example of 206B among the laser sources (induced-emission light sources) 206R, 206G, and 206B. A semiconductor laser is suitable for the laser source 206B in view of costs, taking consideration into the productivity, output power, space factor, and mass-production advantage.

At first, explanation will be made of basic principles of the laser source for the laser beams guided by the light guide means with reference to the drawings.

Figure 3A:
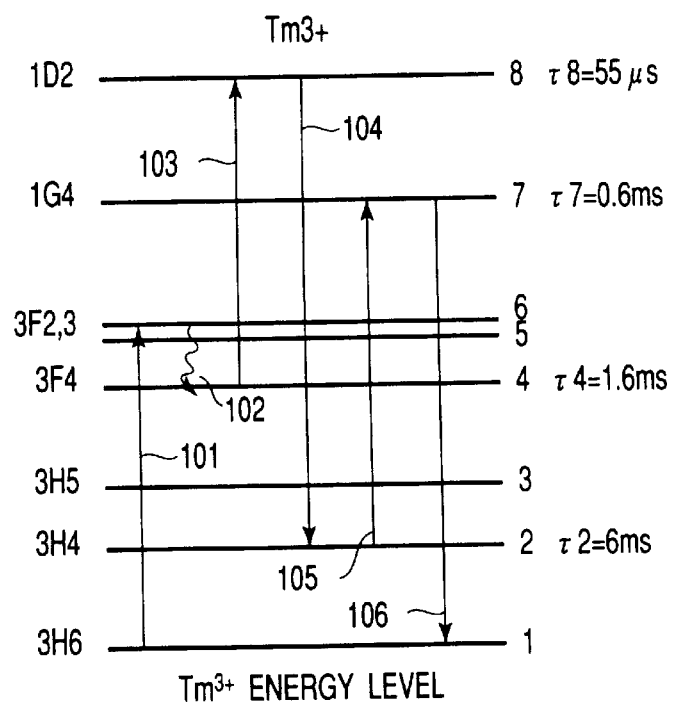
FIGS. 3A and 3B are explanatory views for energy levels and power density distributions at the respective energy levels, to explain a principle of the induced-emission light source.
Figure 3B:
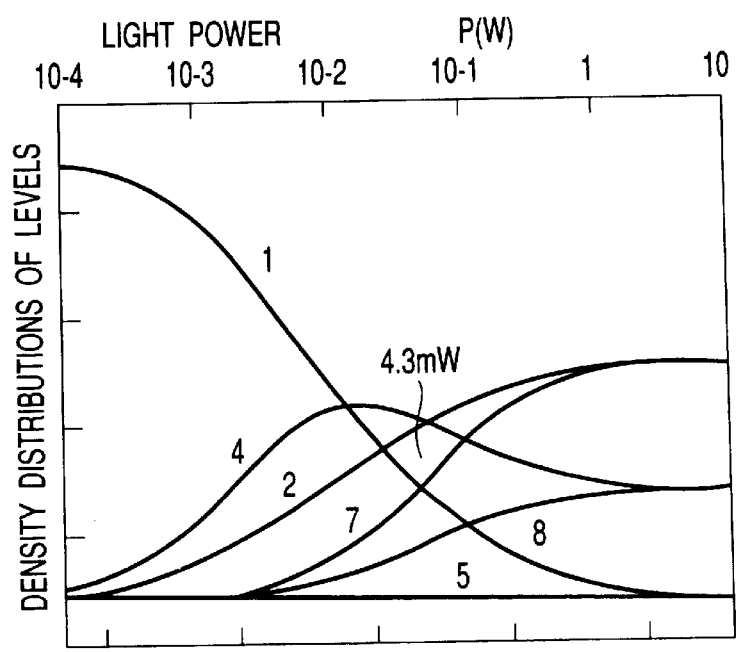

FIG. 3A shows energy levels and transition of light emission in order to explain the operation principles of the induced-emission light source. In FIG. 3B, the ordinate indicates the distribution density of $Tm^{3+}$ ions at respective levels, and the abscissa indicates the light power P (W).

Points which have attracted attention will be explained at first. Where FIG. 3B is considered, a cross-point appears between levels 7 and 1 as the light power increases. The distribution density of the level 7 then exceeds the distribution density of the light power and causes an inversion. This shows that a CW output of 480 nm is possible. That is, the light-emission transition 106 shown in FIG. 3A can continue.

However, even though the light power is increased, the distribution density of the level 8 does not exceed the distribution density of the level 2 and the CW output of even 450 nm cannot be obtained. The main reason of this is that the lifetime of electrons staying at the level 2 is as long as 6 ms and the lifetime of electrons staying at the level 8 is as short as 55 $\mu$s.

The display light sources require wavelengths of 610 nm to 630 nm for red, 510 nm to 530 nm for green, and 460 nm to 470 nm for blue, and an output of W (Watt) class or more. With respect to red and green, the wavelengths have more or less tolerable widths. However, the wavelength is very critical with respect to blue. If the wavelength of blue shifts to the side of a shorter wavelength, the light becomes violet. Particularly, the color-reproducible range becomes very narrow if the wavelength shifts to the side of a longer wavelength.

Although a gallium-nitride-based laser diode is known as a laser which emits light having a blue wavelength, it is difficult to use this laser diode for the purpose of a display, for the present, from the viewpoints of its output and reliability.

However, thulium (TM) has a possibility of outputting simultaneously lights of 450 nm and 480 nm, and can therefore be used as a light source substantially equivalent to light of 460 nm to 470 nm in use for a display.

Meanwhile, the CW (continuous wave) is naturally required for application to a display. Although the CW can be attained with respect to the output of 480 nm from the physical characteristic of Tm, the CW output is very difficult for 450 nm, due to the relationship with the levels 8 and 2 described above.

Consider a state in which the power is very high in FIG. 3B, e.g., the area near 2 W. At this time, the distribution density of the level 7 is greater than the distribution density of the level 1, so an inverted distribution state exists. When the level 7 is 43 mW or more, it is in an inverted distribution state.

Suppose, at this time, that induced emission (light-emission transition indicated by the arrow 106) is forcedly carried out between the levels 7 and 1 in FIG. 3A. Light having a wavelength of 480 nm is emitted by performing induced emission (light-emission transition indicated by the arrow 106) from the level 7 to the level 1. Due to this effect, the distribution density of the level 7 decreases and the distribution density of the bottom level 1 increases.

Since a state in which sufficient excitation is performed by the excitation light having a wavelength of 650 nm is assumed, absorption of excitation light becomes bettor as the distribution density of the level 7 decreases, and absorption transition (arrow 105) from the level 2 to the level 7 is realized efficiently, and the distribution density of the level 2 decreases.

In addition, as the distribution density of the level 1 increases, excitation light is absorbed so that absorption transition (arrow 101) is achieved from the level 1 to the levels 5 and 6. However, since the levels 5 and 6 provide short lifetime, non-emission transition (arrow 102) to the level 4 occurs incidentally, so that the distribution density increases.

When the distribution density of electrons of the level 4 increases and that of the level 2 decreases, transition route from the level 4 to the level 8 and further to the level 2 is completed.

That is, in a state in which sufficient excitation is achieved by excitation light having a wavelength of 650 nm, the excitation light is further absorbed so that absorption transition (arrow 108) from the level 4 to the level 8 is achieved and the distribution density of the level 8 increases.

Through the process as described above, the relation between decrease in distribution density of the level 2 and increase in distribution density of the level 8 appears, and the distribution density of the level 8 exceeds the distribution density of the level 2, so that inverted distribution is realized between both levels. By realizing this state, radiation at the wavelength of 450 nm is achieved by transition (arrow 104) from the level 8 to the level 2.

Since the radiation at this wavelength of 450 nm increases the distribution density of the level 2, the distribution density of the level 2 is settled at a value in the equilibrium of the system if this system attains equilibrium.

Specifically, at this time, the distribution densities of the other levels are each settled in certain equilibrium.

That is, $Tm^{3+}$ ions are supplied with a sufficient excitation light density, and radiation light having a wavelength of 480 nm is sufficiently induced and emitted, so that absorption transition (arrow 105) from the level 2 to the level 7 is actively carried out. In this manner, the distribution density of the level 2 is reduced as a result, and the distribution density of the level 8 is increased.

As a result of this, radiation light having a wavelength of 480 nm and induced emission from the level 8 to the level 2 (light-emission transition indicated by the arrow 104) can be obtained simultaneously.

Based on the principles described above, the specific structure of the embodiment 1 will be explained in details with reference to FIG. 2. In FIG. 2, the reference 301 denotes an excitation light source device and is constructed by a laser diode chip (or a SLD (Super-Luminescent Diode)) which outputs excitation light near the center wavelength of 650 nm. The reference 302 denotes a drive device for driving the excitation light source device 301, and is constructed by a power/circuit system.

The reference 305 denotes an optical fiber made of a material having low phonon energy, such as fluoride or the like. $Tm^{3+}$ ions are added to the core part of the fiber. The reference 303 denotes a coupling element constructed by a wave guide path for connecting the excitation light source 301 with the optical fiber 305. The reference 304 denotes a mirror constructed by an optical member which reflects excitation light emitted from one end of the excitation light source device 301. For example, this is constructed by a multi-layer film made of a dielectric material formed at an end of the excitation light source device 301, and has a high reflection factor of 99% or more with respect to a wavelength near 650 nm of the excitation light. The reference 308 denotes a fiber grading (mirror) prepared in the optical fiber 305, which is processed to have a grading such that a high reflection factor of 99% or more can be obtained with respect to light near the excitation wavelength of 650 nm. That is, the grading is a mirror constructed by changing partially the optical fiber such that its reflection factor changes cyclically in relation to the wavelength. The references 306 and 307 are also mirrors whose band ranges are widened by gradually changing the grading cycle in the lengthwise direction so as to reflect lights of both wavelengths of 450 nm and 480 nm.

In addition, the mirror 306 is constructed to have a reflection factor of 99% or more with respect to lights having wavelengths (450 nm and 480 nm), and the mirror 307 is constructed to have different partial reflection factors with respect to the wavelengths.

The reference 309 is a polarization element inserted in a fiber and is constructed, for example, by inserting a polarizer prepared by an optical member in a slit provided in the optical fiber 305.

Next, operation will be explained with reference to FIG. 2.

At first, excitation light is emitted from both ends of the excitation light source device 301. Excitation light emitted from the rear end surface of the excitation light source 301 is reflected by the mirror 304 and passes again through the excitation light source device 301, so it is amplified. Excitation light emitted from the front end surface enters into the optical fiber 305 through the coupling element 303. This excitation light is reflected by the mirror 308 and again enters into and passes through the excitation light source device 301, so it is amplified. That is, with respect to the excitation light (650 nm), a resonator is constructed between the mirrors 304 and 308, and a high excitation light density can be maintained in the optical fiber 305, due to the resonator structure. This excitation light is absorbed by $Tm^{3+}$ ions added to the optical fiber 305.

Like the principles as described above, lights having wavelengths of 450 nm and 480 nm can be emitted by setting the light density of the excitation light to be very high. Therefore, a resonator is constructed by the mirrors 306 (high reflection) and the mirror 307 (partial reflection) with respect to radiation lights having the wavelengths of 450 nm and 480 nm. In addition, a resonator having a high Ω value with respect to polarization in a specific direction is created by the polarization element 309 inserted in the optical fiber 305. Lights having these wavelengths are excited strongly with respect to their polarization.

The lights repeatedly reflected and amplified inside the resonator, which maintains a high excitation light density, cause laser oscillation. Parts of these lights are transmitted through the mirror 307 for partial reflection and are simultaneously outputted as lights having wavelengths of 450 nm and 480 nm.

As described above, energy control inside the fiber is carried out by resonators. Resonators are constructed for a plurality of wavelengths, respectively. Light having a wavelength necessary for excitation is enclosed in the fiber, and light having a necessary wavelength is extracted. That is, in this embodiment, the first resonator functions with respect to light having a wavelength of 650 nm, and the second resonator functions with respect to lights having wavelengths of 450 nm and 480 nm. Lights having wavelengths of 450 nm and 480 nm are then extracted.

An embodiment which will be described later will clarify various modified means for energy control.

In the embodiment described above, the mirrors in the optical fiber 305 are not limited to the positions as described in the present embodiment. It is apparent that the same operation and function are obtained if the positions of the mirrors 307 and 308 are replaced with each other.

The position of the polarizer 309 is not limited to the position as described in the present invention as long as it is situated in the resonator constructed by the mirrors 306 and 307.

Although the mirror 307 partially reflects both of the lights of 450 nm and 480 nm, this mirror may be constructed by dividing a mirror having a narrow band range into two pieces which respectively have partial reflection factors with respect to the lights having wavelengths of 450 nm and 480 nm.

The excitation light source device 301 may be a light source capable of oscillating at a high light density. For example, a semiconductor laser may be used. In this case, the mirror 304 is not required.

The mirrors in the light fiber 305 may each be a mirror which is made of a multi-layer film and a narrow band range.

In addition, a polarization preservation fiber which has a core having an asymmetric cross-sectional shape may be used as the optical fiber 305.

The polarization element 309 is not an element essential to the present invention but may be omitted in case where output light does not require constant polarization. This also applies to an embodiment described below.

A report has been made with respect to an up-conversion laser capable of obtaining an output of 545 nm when $Ho^{3+}$ ions are excited with excitation light having a wavelength 645 nm near 645 nm. A green up-conversion fiber laser device with high efficiency can be constructed by using an optical fiber 305 to which $Ho^{3+}$ ions are added in place of $Tm^{3+}$ ions, by using a light source device which emits excitation light having a wavelength near 645 nm in place of the light source device 301, and by setting reflection center wavelengths near 645 nm for the mirror 308, and near 545 nm for the mirrors 306 and 307, in the same structure as that of the embodiment described above.

It has also been reported that an optical output having a wavelength of 545 nm can be obtained when $Er^{3+}$ ions are excited with light near a wavelength of 970 nm or 800 nm. In this case, a green up-conversion fiber laser device with high efficiency can be constructed by using an optical fiber 305 to which $Er^{3+}$ ions are added in place of $Tm^{3+}$ ions, by using a light source device which emits excitation light having a wavelength near 970 nm or 645 nm in place of the light source device 301, and by setting reflection center wavelengths near 970 nm or 800 nm for the mirror 308, and near 545 nm for the mirrors 306 and 307, in the same structure as that of the embodiment described above.

Figure 4:
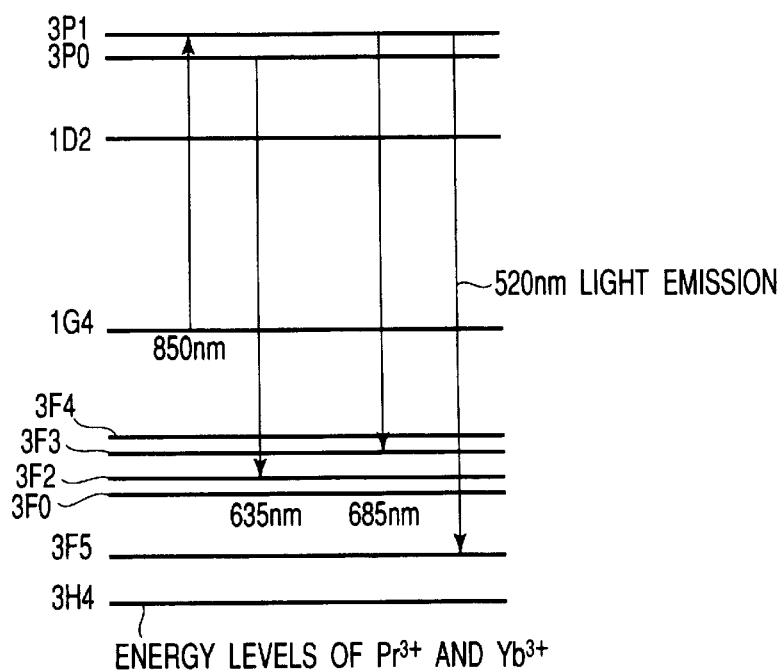
FIG. 4 is an explanatory view for energy levels to explain another principle of the induced-emission light source.

The material used for the semiconductor laser is not limited to those described above but $Pr^{3+}$ and $Yb^{3+}$ may be used. FIG. 4 shows energy levels thereof.

Figure 5:
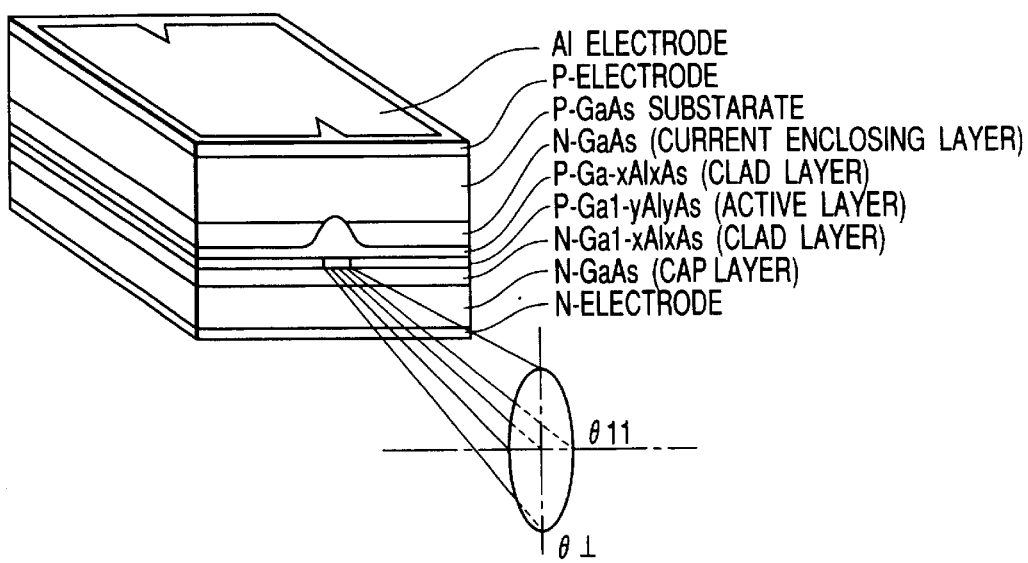
FIG. 5 is a view showing a basic structure of a semiconductor chip capable of obtaining laser light emission.

FIG. 5 shows a basic structure of a semiconductor chip capable of obtaining laser light emission. This semiconductor chip is constructed by an N-electrode, N-GaAs (gap layer), N-Ga1-xAlxAs (clad layer), N-Ga1-yAlyAs (active layer), P-Ga-xAlxAs (clad layer), N-GaAs (current enclosing layer), P-GaAs substrate, P-electrode, and Al electrode.

Figure 6A:
FIGS. 6A to 6C are views showing simplified structures of red, green, and blue light sources each constructed by using an induced-emission light source.
Figure 6B:
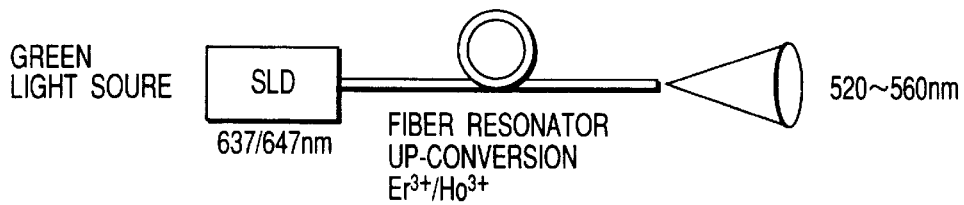
Figure 6C:
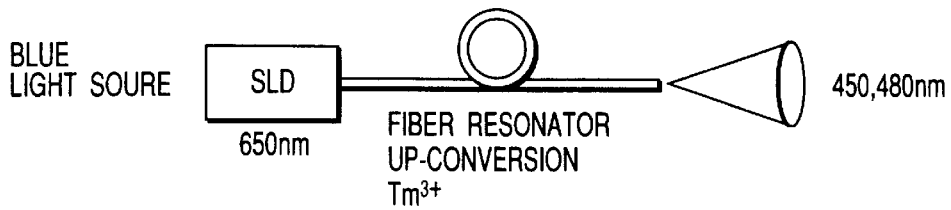

FIGS. 6A, 6B, and 6C show simplified structures of a red light source (630 to 650 nm), green light source (520 to 560 nm), and a blue light source (450 and 480 nm), which are constructed by using the above-described principles.

Figure 7A:
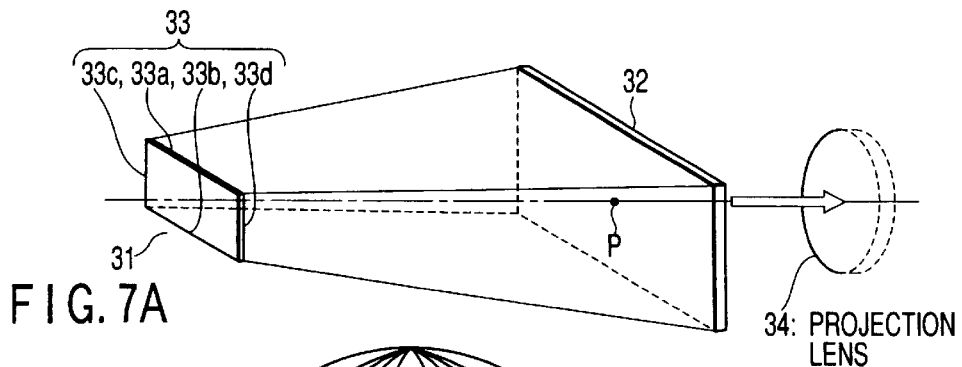
FIG. 7A is a view showing a basic principle of a light integrator according to the present invention.
Figure 7B:
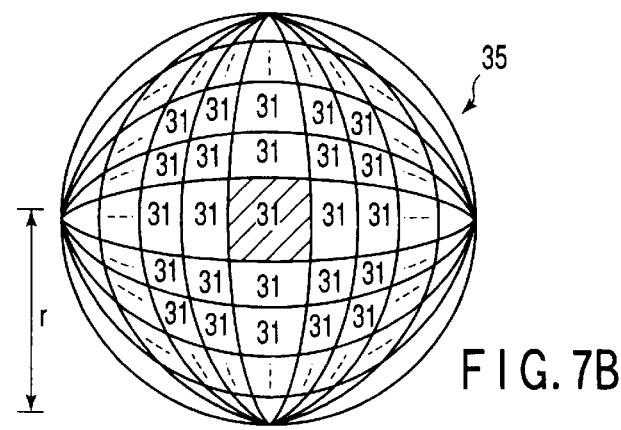
FIG. 7B is a view showing an example of a reflection surface of the light integrator.

FIGS. 7A and 7B show a basic principle of an illumination system using the light integrator according to the present invention.

In FIGS. 7A and 7B, the reference 31 denotes a diffusive reflection surface (which functions as a surface light source), and the reference 32 denotes an irradiation surface. The space in the periphery of the diffusive reflection surface 31 and in the periphery of the irradiation surface 32 is surrounded, for example, by a mirror (guide scope) 33. However, this space may be filled with resins or may be constructed by a prism.

To simplify the explanation, it is supposed that the irradiation surface 32 is a rectangle having an arbitrary aspect ratio and only one illumination optical system is shown among the systems of three colors described above.

The diffusive reflection surface 31 is, for example, an aggregate of red LED light sources and has a shape whose vertical and horizontal dimensions are smaller than those of the irradiation surface 32. The effective outer circumferential ends of the diffusive reflection surface 31 and that of the diffusive reflection surface 32 are surrounded by mirrors 33a, 33b, 33c, and 33d without gaps. Where they are viewed from the center observation part "P" of the irradiation surface 32, mirror images based on the diffusive reflection surface 31 and the mirrors 33a, 33b, 33c, and 33c are observed as an elliptic spherical light source having radii determined by the dimension ratio between the irradiation surface and the diffusive reflection surface 31.

That is, light emitted from the diffusive reflection surface 31 reaches the observation point "P" of the irradiation surface 32. A projection-type optical device with high efficiency and uniformity can be obtained if a sufficient distance is maintained between the diffusive reflection surface 31 and the irradiation surface 32 and if the projection system (projection lens system) 34 has a divergence angle of maximum illumination light based on mirror images of the light source, as its F-value.

The F-value which is achieved by the projection system (projection lens) 34 need not always cover all the range of the mirror images. The effect (of uniform projection with high efficiency) is caused remarkably when the light source emits light in a perfect diffusion state and the mirrors 33a, 33b, 33c, and 33d do not substantially causes reflection loss.

Basically, in the light integrator 33 used in the present invention described above, the diffusive reflection surface 31 and the irradiation surface 32 (irradiation surface or display surface) are arranged such that their center axes substantially correspond to each other. Further, the light integrator has reflection mirrors 33a to 33d which surround the space created by the diffusive reflection surface 31 and the irradiation surface 32. The cross-sectional area of the light integrator on any position in the center axes direction is larger than the diffusive reflection surface 31. Thus, the light integrator 33 is constructed by the upper, lower, left, and right mirrors 33a, 33b, 33c, and 33d.

Figure 8:
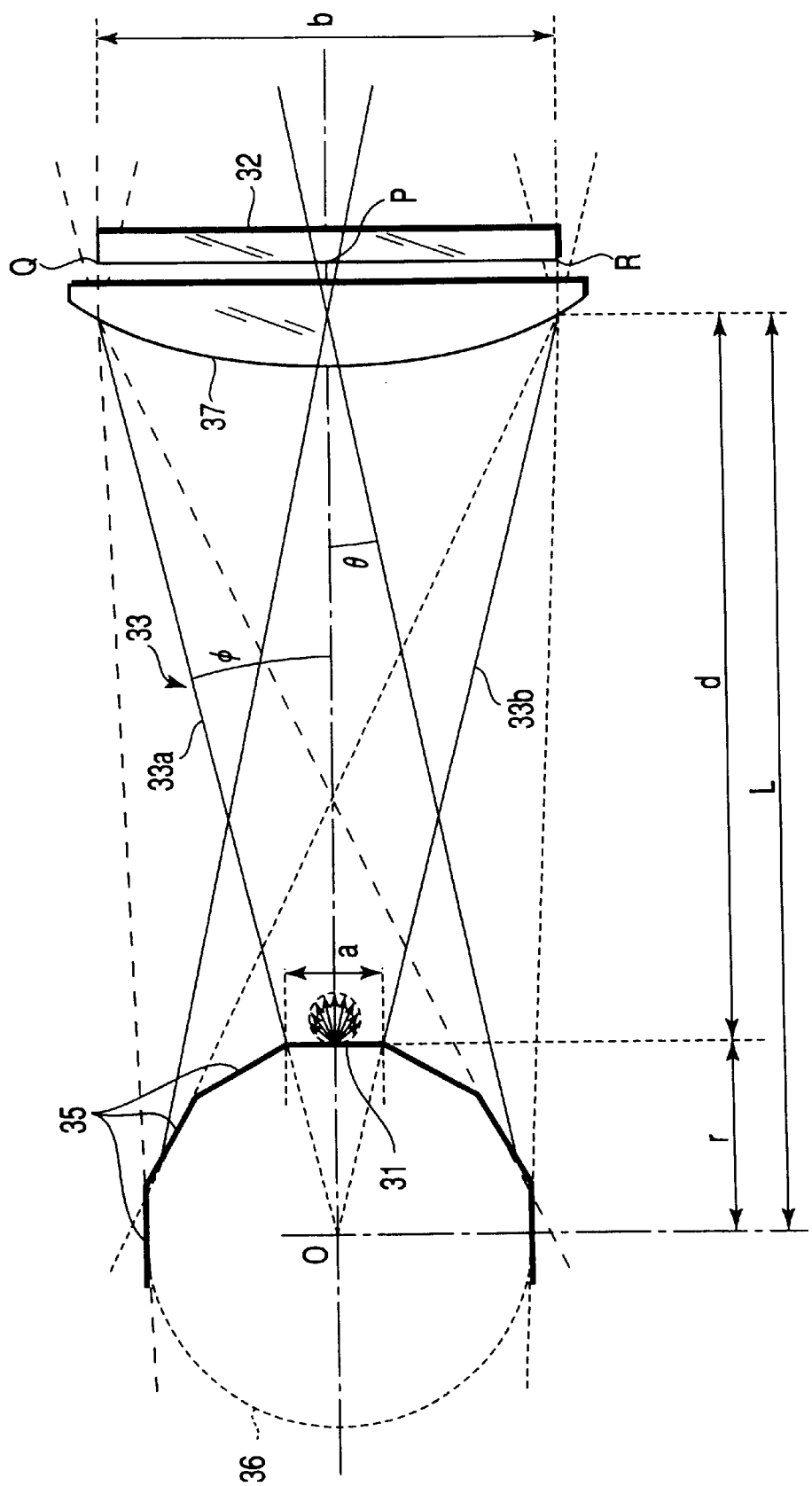
FIG. 8 is an explanatory view for basic concept of a light integrator in construction of an illumination device according to the present invention.

FIG. 8 shows basic conception in construction of the above device. To simplify the explanation, the embodiment is based on a structure for single color, and the diffusive reflection surface 31 and the irradiation surface 32 are arranged to be symmetrical with respect to the optical axis, and the figure shows a two-dimensional cross-sectional view including the light source.

Suppose that the size of the diffusive reflection surface 31 is "a", the size of the irradiation surface 32 is "b", and the distance between the diffusive reflection surface 31 and the irradiation surface 32 is "d". Further, the ends of the diffusive reflection surface 31 and the ends of the irradiation surface 32 are surrounded without gaps, by the mirrors 33a, 33b, 33c, and 33d opposed to each other. At this time, the diffusive reflection surface 31 and the diffusive reflection surface 31 and the light source mirror image 35 are arranged on a circle 36 having a radius "r" which is the distance from the diffusive reflection surface 31 to a cross-point "O" of extended lines of the mirrors 33a and 33b, viewed from the center observation point "P" of the irradiation surface 32.

If a sufficient illumination distance "d" is maintained, the mirror image 35 can be considered as the circle 36 (hereinafter called a mirror image spherical surface). Therefore, the maximum illumination angle to the observation point "P" is an angle "θ" between the optical axis and a tangent to the circle 36 from the point "P". Where the distance from the irradiation surface 32 to the cross-point of the extended lines of the mirrors 33a and 33b is "L" and the angles of the mirrors 33a and 33b to the optical axis are each "φ", the followings are given:

$$r = d \times a/(b-a) \quad (1)$$

$$L = d \times b/(b-a) \quad (2)$$

$$\phi = \tan^{-1}\{(b-a)/(2d)\} \quad (3)$$

Hence, the illumination angle "θ" is:

$$\theta = \sin^{-1}(r/L) = \sin^{-1}(a/b) \quad (4)$$

Therefore, the minimum F-value of the projection system that can cover the entire illumination angle defined above is:

$$F = 1/(2\sin\theta) = b/(2a) \quad (5)$$

This F-value does not depend on the illumination distance "d".

Therefore, if the dimensional ratio of the surface of the light source and that of the irradiation surface 32 are equal to each other, viewed from any direction, i.e., the surface of the light source and the irradiation surface 32 are similar to each other, the diffusive reflection surface 31 and the mirror image 35 thereof are observed as a spherical shape having a radius "r", viewed from the observation point "P".

Meanwhile, even if the observation point P is apart from the optical axis, the center O of the spherical surface 36 of the mirror image does not change. Therefore, the telecentricity which is an important factor for projection illumination is ensured by providing a collimator lens 37 having a focus distance L (=b·d/(b−a)) in the side of light emission of the light integrator 33.

In this respect, as shown in FIGS. 9A, 9B, and 9C, where the side of the light source part 31 (i.e., the diffusive reflection surface 31) is viewed from the observation point P, the above-described relationship between the sizes a and b can be maintained without influences from relay lenses 37, 38, 39, and the like, as far as the mirror image spherical surface 36 which can be regarded as a sphere exists and highly convergent optical coupling can be maintained. That is, under the condition for maintaining the light convergence efficiency, optical luminance constancy is maintained without depending on the relay system.

In the present invention, the light source described above is realized by the diffusive reflection surface, based on the basic structure as described above. As an example thereof, a means for irradiating the diffusive reflection surface 31 with light is provided. Adopted as this means may be a means which inputs, in the direction opposite to the illuminating direction, a laser beam having a strong directivity and generated from a semiconductor laser element as an induced emission light source. By adopting this structure, an illumination optical system with high quality and high efficiency of a projection-type light valve can be obtained with use of simple design conditions and general cheap illumination optical parts.

Figure 10:
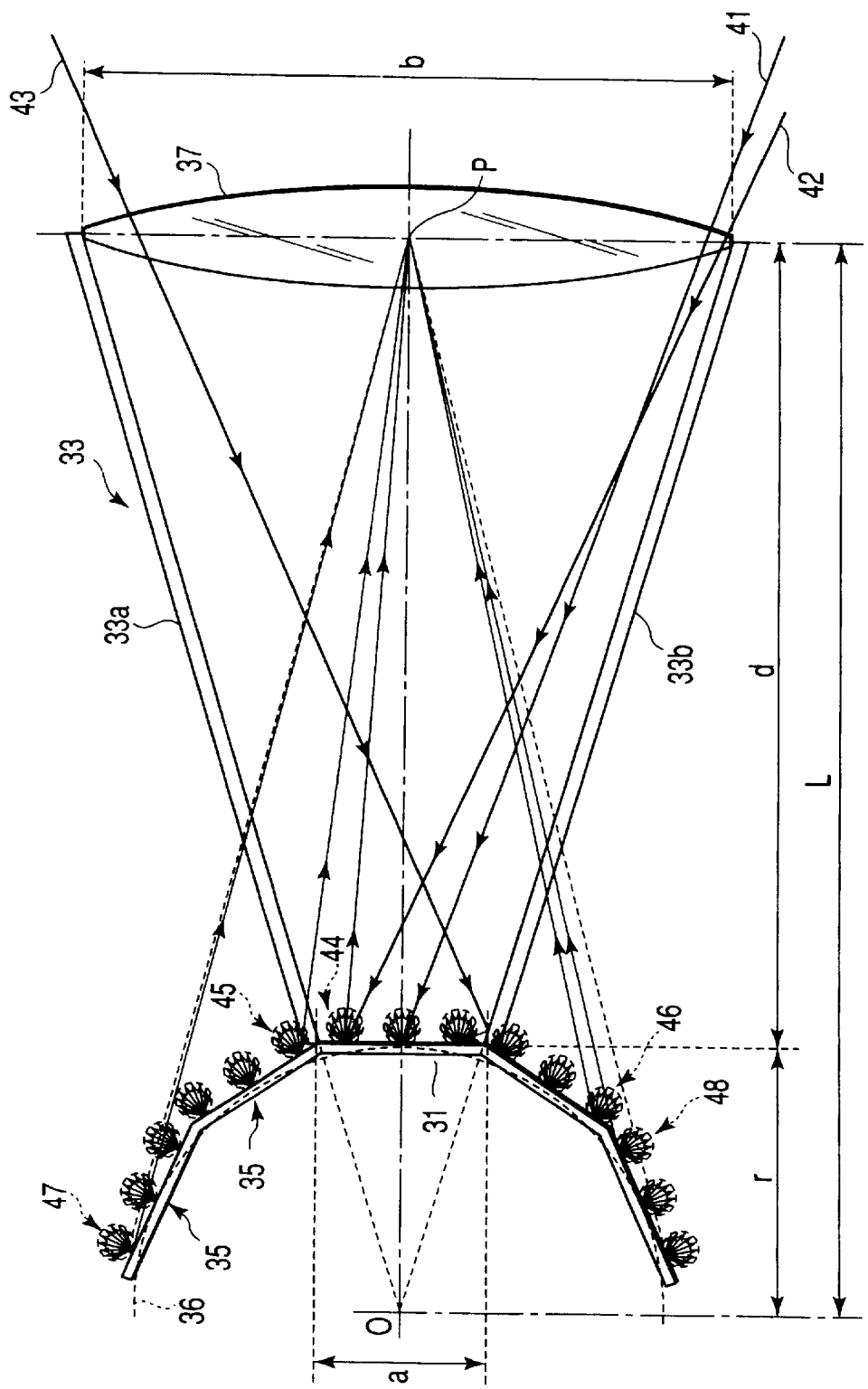
FIG. 10 is a view showing a basic structure of a basic embodiment of the inventions.

FIG. 10 shows a basic embodiment of the inventions.

Figure 9:
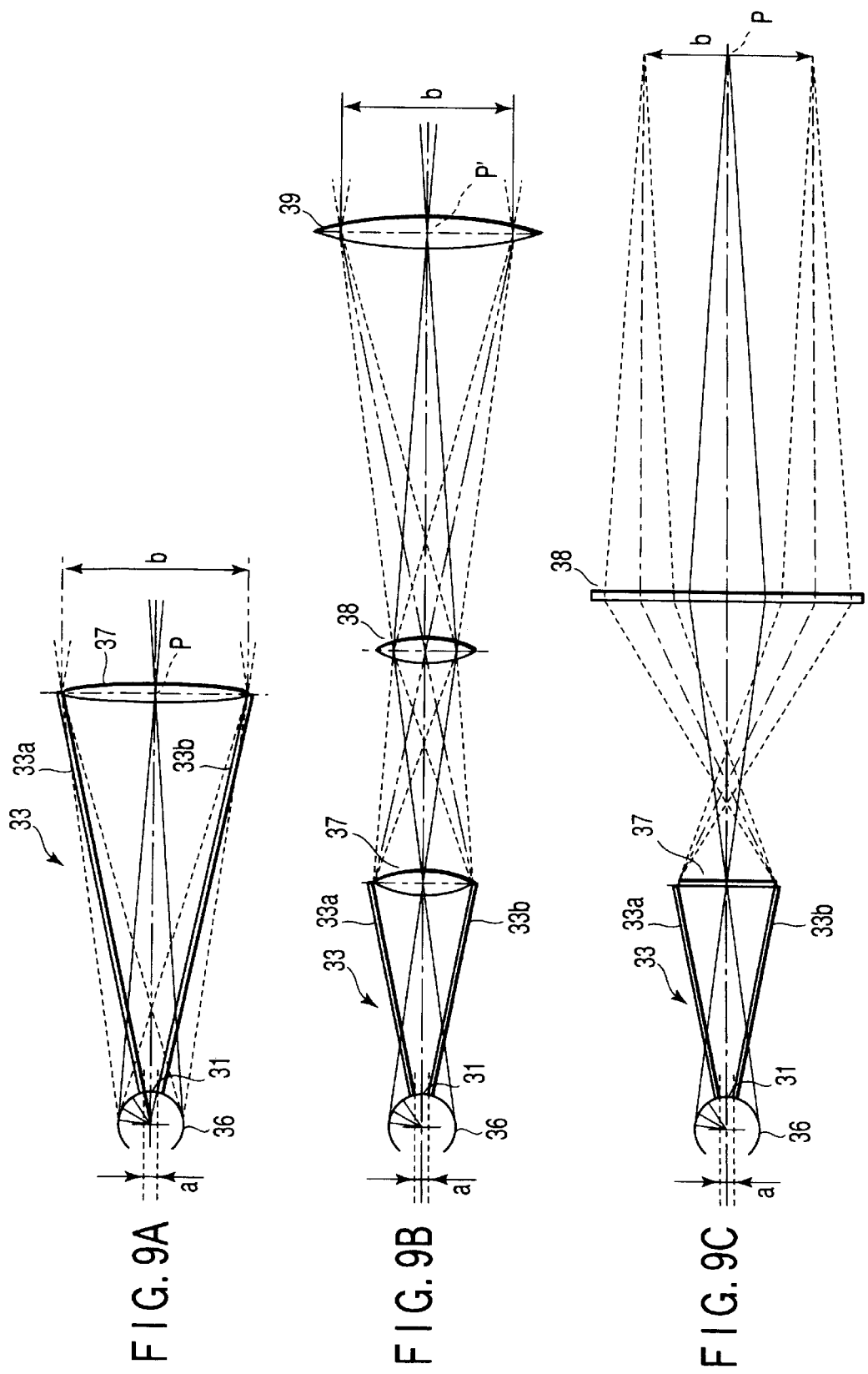
FIGS. 9A to 9C are views for explaining existence of a mirror-image spherical surface which can be regarded as a sphere and a range in which light coupling with high convergence is maintained, in case where the side of the light source is observed from an observation point P in the light integrator.

That is, explanation will be made below denoting those parts common to FIGS. 7A, 8, and 9 at common references. Light generated from a laser light source and having a strong directivity is introduced into the light integrator 33 and irradiated on the diffusive reflection surface 31. In this case, light is irradiated through routes as indicated by arrows 41, 42, and 43 in FIG. 10. That is, the light having a strong directivity is inputted from the open side of the light integrator 33 surrounding the diffusive reflection surface 31 and, for example, also from the outside of the light valve or the illumination setting range b. The light thus introduced is further introduced through the inner surface of the light integrator 33 to the diffusive reflection surface 31 or is directly introduced to the diffusive reflection surface 31 and reflected therefrom.

At this time, the laser beam is converted, through the diffusive reflection surface 31, into a diffusive light source which takes the laser beam arrival position as the light source. As a result, reflection light can be observed on the mirror-image spherical surface described above, when the inside of the light integrator 33 is observed from the observation point P.

The effect of the diffusive reflection surface 13 and the light integrator 33 can be explained as follows with respect only to the incident laser beam (arrow 42). The laser beam inputted through the route indicated by the arrow 42 reaches a position 44 and is thereby diffused and reflected. Of this diffused and reflected light, part of the direct light reaches the observation point P.

In addition, of the light reflected on the diffusive reflection surface 31, part of primary reflection light the positions 45 and 46 of the primary mirror image also reach the observation point P. Likewise, where secondary reflection light of the light integrator 33 is viewed from the observation point P, it is observed as if laser reflection light from the positions 47 and 48 of the mirror image 35 reaches.

Suppose now that the reflection characteristic of the diffusive reflection surface 31 has a perfect diffusivity and that the reflection efficiency of the light integrator 33 is negligibly excellent. The light sources at positions 44 to 48 including the mirror image, which reach the observation point, have equal luminance. Therefore, the luminance values of the positions 44 to 48 are integrated by the angle distribution, luminance similar to the luminance on the optical axis can be obtained. That is, tele-centricity can be maintained.

This tele-centricity is secured with respect to the laser beam, which passes through the route indicated by the arrow 41 and reaches the diffusive reflection surface 31, as it needs no explanation. Likewise, the tele-centricity is secured with respect to laser beam which is reflected on the inner surface of the light integrator 33 and reaches the diffusive reflection surface 31, through the route indicated by the arrow 43. This means that the incidence condition for the laser beam is tolerant. This kind of embodiment is effective as an illumination system for a projection-type projector in which a DMD (Digital Micro-mirror Device) or the like using no polarization control is used as a light bulb. The DMD is an optical spatial light modulator used for a display, projector, or the like. That is, light from the light integrator 33 is irradiated on the DMD, and reflection light therefrom is projected onto a screen.

Next, in case of using a light valve using polarization control such as liquid crystal or the like, a polarization plate is used to convert illumination light into polarized light in only one direction if the illumination light is randomly polarized. This must be used as the illumination light for the light bulb.

Originally, a laser beam has a characteristic of induced emission, and therefore, polarized light thereof is uniform. However, if a laser beam passes many times through a shaped product made of resins which causes stress, a coated lens, or the like, its polarization degree is lost.

With respect to the light integrator, the polarization characteristic is degraded through a plurality of reflections. Therefore, if this is used for illumination light of a liquid crystal light bulb, about half of the light is lost due to the polarization plate. At this time, the light is absorbed by the polarization plate, so that heat generation processing is required or problems remain with respect to functional reliability. Further, since light utilization efficiency is reduced to half, there are disadvantages in brightness and ratio between brightness and power.

To solve these problems, the inventions may further adopt a structure as follows.

FIG. 11 is a view showing further another embodiment of the present invention. The layout position of this optical system is useful when the embodiment is used as a light relay device between the light integrator 33 and the light incidence surface of a light bulb.

The lens 51 is equivalent to one fly-eye among fly-eye lenses. When light 52 having tele-centricity and an arbitrary diffusion angle is let enter into the lens 51, the light is converged onto the light axis of a relay lens 54 provided at the focus position of the lens 51. The polarization mirror 53 transmits a p-polarization component and reflects an s-polarization component.

Suppose now that the light 52 incident to the lens 51 from the light integrator has a maximum diffusion angle which is obtained by the lenses 51 and 54. At this time, the maximum diffusion light includes a straight-traveling component parallel to the optical axis within an area substantially equal to the area a. That is, the thickness of light is maintained and relayed to the lens 55 (convergence lens). The lens 55 is positioned apart from the focus distance of the lens 54.

Next, the polarization mirror 53 is provided at an angle of 45 degree with respect to the optical axis. Therefore, the s-polarization component is reflected in the direction at 90 degree to the optical axis of the lens 51. A relay lens 56 is provided in the forward traveling direction of the s-polarization component. This lens 56 is provided at a position at the focus distance of the lens 51 so as to have a relationship similar to the relationship between the lenses 51 and 54. Light which has passed through this lens 56 is reflected by a polarization mirror 57. This polarization mirror 57 is provided at an angle of 45 degree to the optical axis of the lens 56, and guides its reflection light (s-polarization component) in parallel with the optical axis of the lens 54 described previously. Light from this polarization mirror 57 is guided to the lens 58 (converging lens). The optical distance between the lenses 56 and 58 is designed to be equal to the optical distance between the lens 54 and 55.

The p-polarization component which has passed through the lens 54 described above passes through a polarization axis rotation plate 59 provided near the lens 54 and is guided to the lens 55.

As a result of arranging this structure, the lights emitted from the lenses 58 and 55 are each s-polarized light. According to this structure, light becomes a constantly-polarized light, so that loss of light can be reduced greatly by a polarization plate provided near a light bulb.

The important point in this structure is that two output lights similar to incident light by performing the process of changing randomly-polarized light into constantly-polarized light. That is, one light source is taken as two light sources (two times), viewed from the side of the projector. Viewed from the opposite side, this means that the light source size a can be reduced to half by the relationship of F=1/(2a) unless the illumination conditions are changed. That is, F=1/(4a) is obtained.

As described above, when polarization illumination must be performed for a light bulb, the size of the diffusive reflection surface is reduced to half of a normally calculated value or less, in both axial directions in which polarization is utilized.

The structure described above, however, tends to increase the number of parts. Hence, in case where polarization illumination is required, the following structure may be adopted to simplify the structure.

Figure 12:
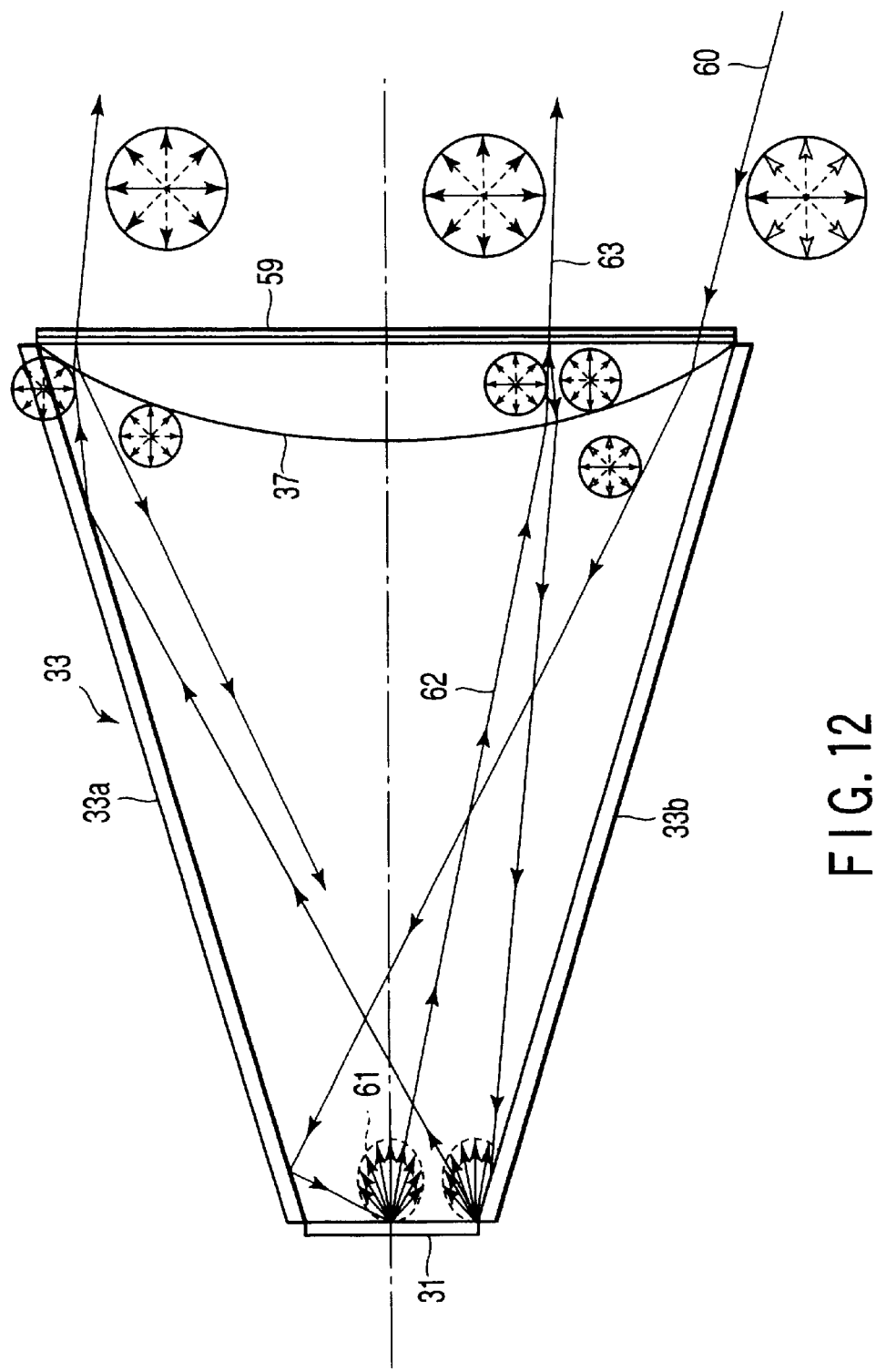
FIG. 12 is a view showing a basic structure of further another embodiment of the inventions.

In FIG. 12, components that are similar to those of the embodiments described previously are denoted at common references. In the present embodiment, only an arbitrary polarization component is allowed to pass the opening part of the light integrator 33, and there is provided a polarization mirror 59 by which the polarization component perpendicular to the arbitrary polarization component with a high efficiency. The longitudinal arrow within the circle shown in the figure means V-polarization. The lateral arrow within the circle shown in the figure means horizontal polarization.

Suppose now that the light source (arrow 60) which is incident light according to the structure shown in FIG. 12 is aligned vertically (V-polarization) as shown in the figure. At this time, the polarization axis of the polarization mirror 59 is set to the V-polarization axis. In this manner, the incident light enters into the light integrator 33 at a high efficiency.

The incident polarized light is reflected and guided to the diffusive reflection surface 31, by the mirrors in the light integrator 33. It is thereby changed into diffusive reflection light 61. Further, the diffusive reflection light 61 travels forward in the direction toward the opening (irradiation surface direction) by arbitrary light-orientation distribution. This light beam is changed into a light beam 62 of random polarization. Of this randomly polarized light, the V-polarization component passes through the polarization mirror 59 and becomes illumination light 63.

The H-polarization component perpendicular to the V-polarization component is reflected to the inside of the light integrator 33 by the polarization mirror 59 and returns to the diffusive reflection surface 31. Further, this component travels as a new diffusive light source toward the opening part. In this manner, the V-polarized lights of randomly polarized lights pass through the polarization mirror 59 to become illumination lights.

The incidence and reflection conditions of the polarization mirror 59 are all determined within the range of the F-value defined under the initial condition, so that reflection and output as described above are basically repeated until all lights are completely lost on the basis of the reflection efficiency of each mirror. As a result, this light integrator illumination device can function as a twin polarization light system.

In the explanation described above, priority is given only to the diffusive size condition (5) of F=1/(2sin θ)=b/(2a), and the illumination distance d has no parameter, i.e., no influence is made from this parameter within a range in which the mirror image can be viewed as a circle or a sphere from the observation point.

In practice, however, the light source and the mirror image are not smooth spheres but have polygonal shapes. Therefore, a shade depending on vertexes of a polygon (the range of the oblique lines 71 and 72 in the figure) are enlarged to an unignorable level particularly within a range in which the illumination distance is short. In this case, the difference is conspicuous between the observation point P which is not influenced from the ranges of the oblique lines 71 and 72 and an observation point Q which is influenced therefrom.

This can be considered to result in a factor which causes uneven illumination or deterioration in the tele-centricity.

Hence, the optimal range of the illumination distance d is attempted while quantifying the influence (influence from the range of the oblique lines).

FIGS. 14A to 14C graphically show the influence of the shade described above on an arbitrary cross-section including the optical axis under arbitrary illumination conduction (in the light integrator and in the cross-section perpendicular to the optical axis direction). The abscissa represents the polarization angle to the optical axis of the light integrator 33 (polarization angle=illumination distance/illumination range). In FIG. 14A, the number of mirror images is represented in the ordinate in the right side, and the mirror angle φ is represented in the ordinate in the left side. In FIG. 14B, the F-value of the illumination system is represented in the ordinate in the left side. Further, in FIG. 14C, the efficiency of the projection system is represented in the ordinate in the left side.

As shown in FIG. 14A, the important point in this case is that a realized actual mirror causes reflection loss. That is, the efficiency as an illumination optical system is deteriorated as the number N of mirror images increases. Also, in this case, the number of mirror images in the direction of the shortest edge (e.g., in the vertical direction on a TV screen) naturally increases much more.

FIG. 14B shows the illumination F-value with respect to the number of mirror images as described above. FIG. 14C shows the convergence efficiency with respect to the projection system, which is obtained by the relationship (5) in case where diffusive reflection has a perfect diffusion characteristic with respect to the number of mirror images.

From the results as described above, a relationship of trade-off exists between the illumination quality and the illumination efficiency (the number of mirror images (reflections)). If the length d in the center axis direction of the light integrator which cause illumination unevenness of 5% or less should be selected, the length may fall within a range from 1.7 times the maximum diagonal to 6 times the maximum diagonal, at which the number of mirror images does not exceed 10 even at the shortest edge. That is, the length d of the light integrator in the center axis direction is designed to fall within a range from 1.7 times the maximum diagonal of the area of the illumination setting range of a light valve to 6 times the maximum diagonal.

As described above, in the device of the present invention, any induced-emission light source such as a semiconductor laser or the like achieves a lower price, compactness, and a high degree of freedom in design. In addition, even with respect to polarization illumination such as a liquid crystal display or the like, it is possible to attain a device with a high illumination efficiency.

Further, with respect to production, an illumination device for a projection-type projector can be provided with high quality and high efficiency, without necessitating investment in production of special parts or highly precise layout of parts.

Furthermore, an illumination device having a much smaller size can be provided at much lower costs, by using, as light sources in the present invention, a semiconductor laser and an up-conversion laser which can provide wavelengths with high output, high efficiency, and high purity and can realize mass-production and a low price together.

The inventions are not limited to the embodiments described above.

In the embodiments described above, for example, a light guide means such as an optical fiber or the like is used as a means for irradiating light from light sources onto the diffusive reflection surface 31. However, attention should be paid to several points in case of installing this light guide means.

Figure 15:
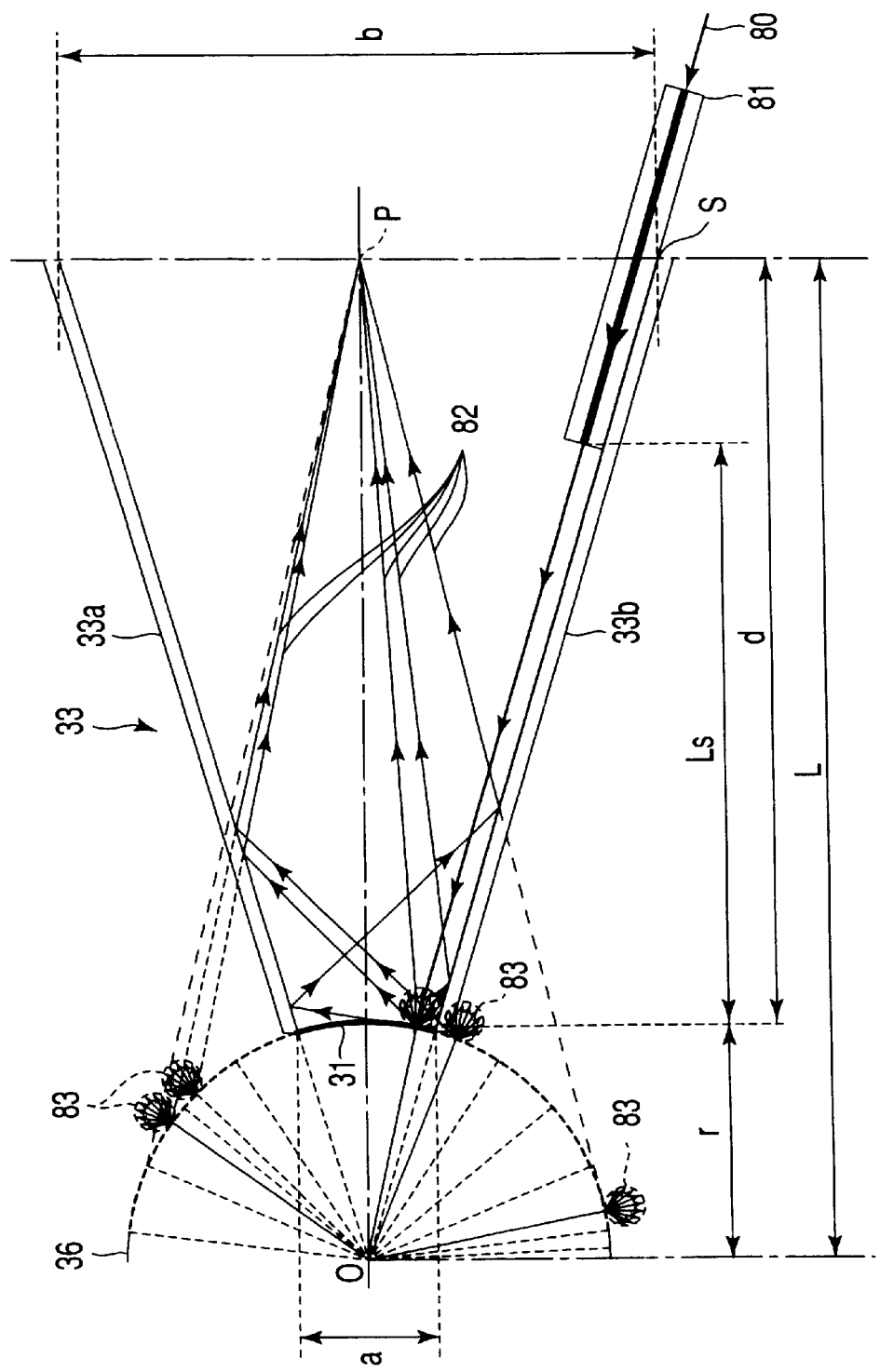
FIG. 15 is a view showing another embodiment of the inventions in which the installation position of an optical fiber as a light guide means is modified.

FIG. 15 shows an embodiment in which the installation position of the optical fiber as the light guide means is modified. Components common to the embodiments described above are denoted at common references.

Suppose that the setting conditions of the light integrator 33 satisfy the expressions (1) to (5) described previously. Suppose also that a laser beam 80 inputted from a laser light source not shown through a wave guide path not shown is inputted from any arbitrary position S of four corners in the diagonal directions of the light integrator 33 through an optical fiber 81. This laser beam 80 reaches the diffusive reflection surface 31 and is thereby diffused and reflected.

To simplify the description, explanation will be made with attention paid to an observation position P on the light axis. Of the diffused and reflected light, only the light reflected in an arbitrary direction is reflected in a predetermined direction by the inner surface of the light integrator 33. In this manner, the light is converted into illumination light 82 which makes a predetermined angle to the observation point P.

Where this state is viewed from the observation point P, it is observed just like light from a light source 83 on a sphere 36 having its center on a cross-point O between an extended surface of the inner surface of the light integrator 33 and an extended line of the center axis of the light integrator 33. Therefore, illumination angle conditions represented by the expressions (4) to (5) are satisfied if a collimator lens 37 as described above is provided near the observation point.

That is, the present embodiment comprises a light integrator 33, which has a reflection mirror surrounding a space formed by an opening part (irradiation surface) and by a diffusive reflection surface 31 provided at an interval in the center axis direction from the opening part and has a cross-sectional area larger than the diffusive reflection surface 31 at any position in the center axis direction, and a light guide means as a light source, which inputs the light irradiated on the diffusive reflection surface 31 in the light integrator 33, in parallel with the reflection mirror as an inner surface of the light integrator. In this manner, an illumination device can be constructed with uniformity and high quality.

In the embodiment described above, the optical fiber 81 seems to create a large shade. However, an actual fiber is so thin as about 50 to 200 μm, and its shade falls within a margin range of light valve illumination of an actual projection-type display, from the viewpoints of light beam keeping conditions and a tolerable range of an actual optical element installation error. Therefore, harmful influences from installation of the optical fiber 81 can be minimized by arranging the optical fiber incidence position S at one of diagonal corners of the light integrator 33. In addition, the position is near the opening part of the light integrator 33 and at a corner part, so that installation services can be easy and reliability can be obtained with respect to the precision of the installation position.

The inventions defined by the claims are not limited to the specific embodiments described above.

In case where a laser beam emitted from the optical fiber 81 has a diffusion angle which is determined by the structure of the optical fiber, limitations are applied to assembly of components and design. Hence, in the present invention, modification is made with respect to the method of attaching the optical fiber to the light integrator 33.

Figure 16:
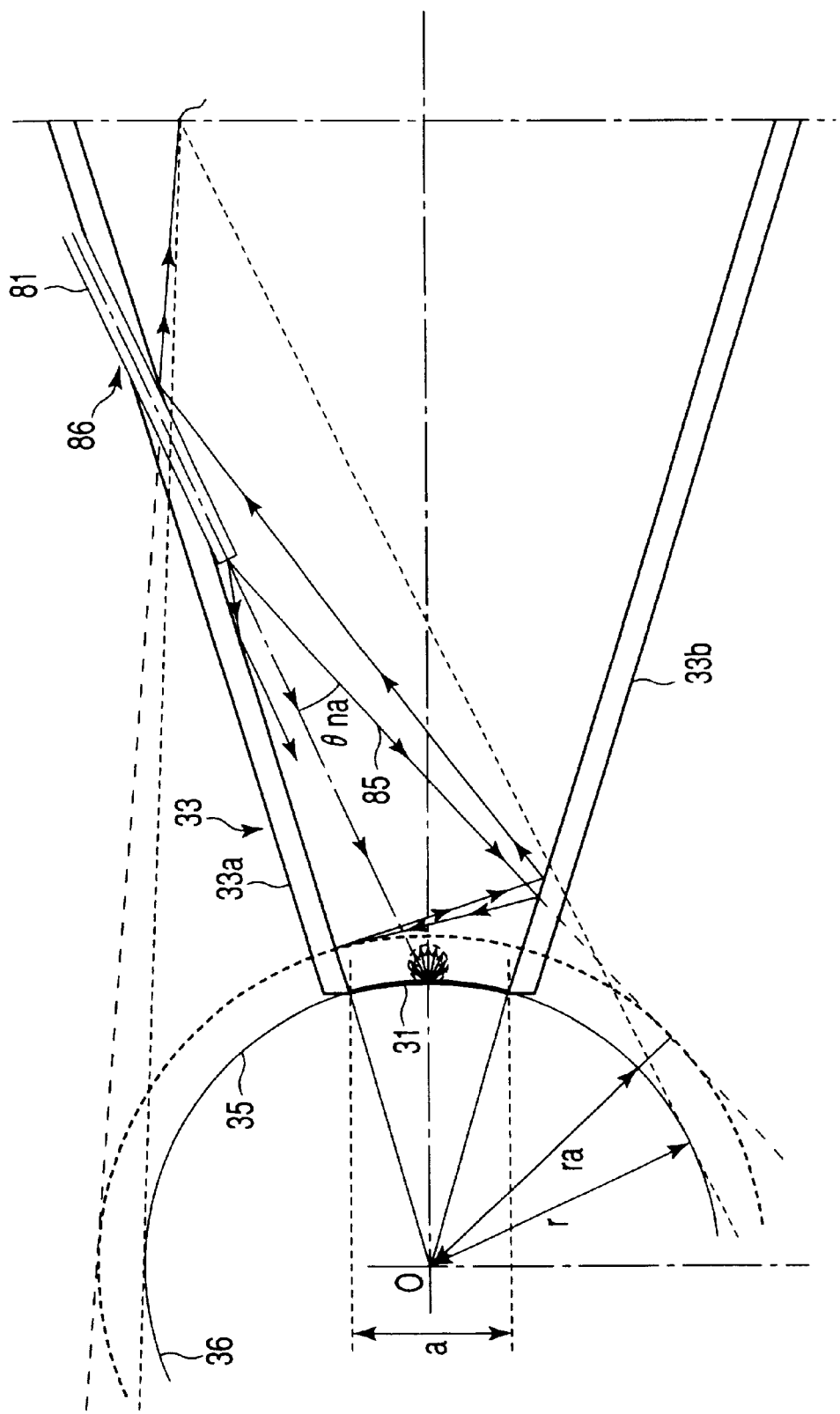
FIG. 16 is a view showing further another embodiment of the inventions in which the method of installing the optical fiber on the light integrator is also modified.

Explanation will be made, denoting the same parts as those of the previous embodiments at equal references in FIG. 16.

If the optical fiber 81 has a divergence angle, there exists a light beam 85 having a maximum angle $\theta na$ with respect to the optical axis of the light emitted from the optical fiber 81, among light beams spreading inside the light integrator 33. If the shortest distance ra between an extended line of the light beam 85 and he cross-point O exceeds the radius r of an ideal mirror image circle (sphere), the range of the mirror image (illumination angle) extends from a mirror image 36 to a mirror image 35 on the surface of a circle (sphere) whose radius is the shortest distance ra. This means that the emission position of the laser beam, as the top end of the optical fiber 81, is too close to the diffusive reflection surface 31. In case of the mirror image 35, the illumination effect is deteriorated.

A condition which clears this kind of drawback, i.e., a condition which does not extend the illumination angle is as follows. All the light beams emitted from the optical fiber 81 should preferably reach the diffusive reflection surface 31, i.e., all the light beams should preferably be within a solid angle range of the circle 36 on which the mirror image 35 depending on the light integrator 33 in case of taking the diffusive reflection surface 31 as a light source exists. That is, it is preferable to set the top end of the optical fiber 81 apart from the diffusive reflection surface 31 such that $\Delta\theta+\theta na$ falls within the solid angle.

This will now be explained to a case of being on the optical axis to simplify the description.

Figure 17:
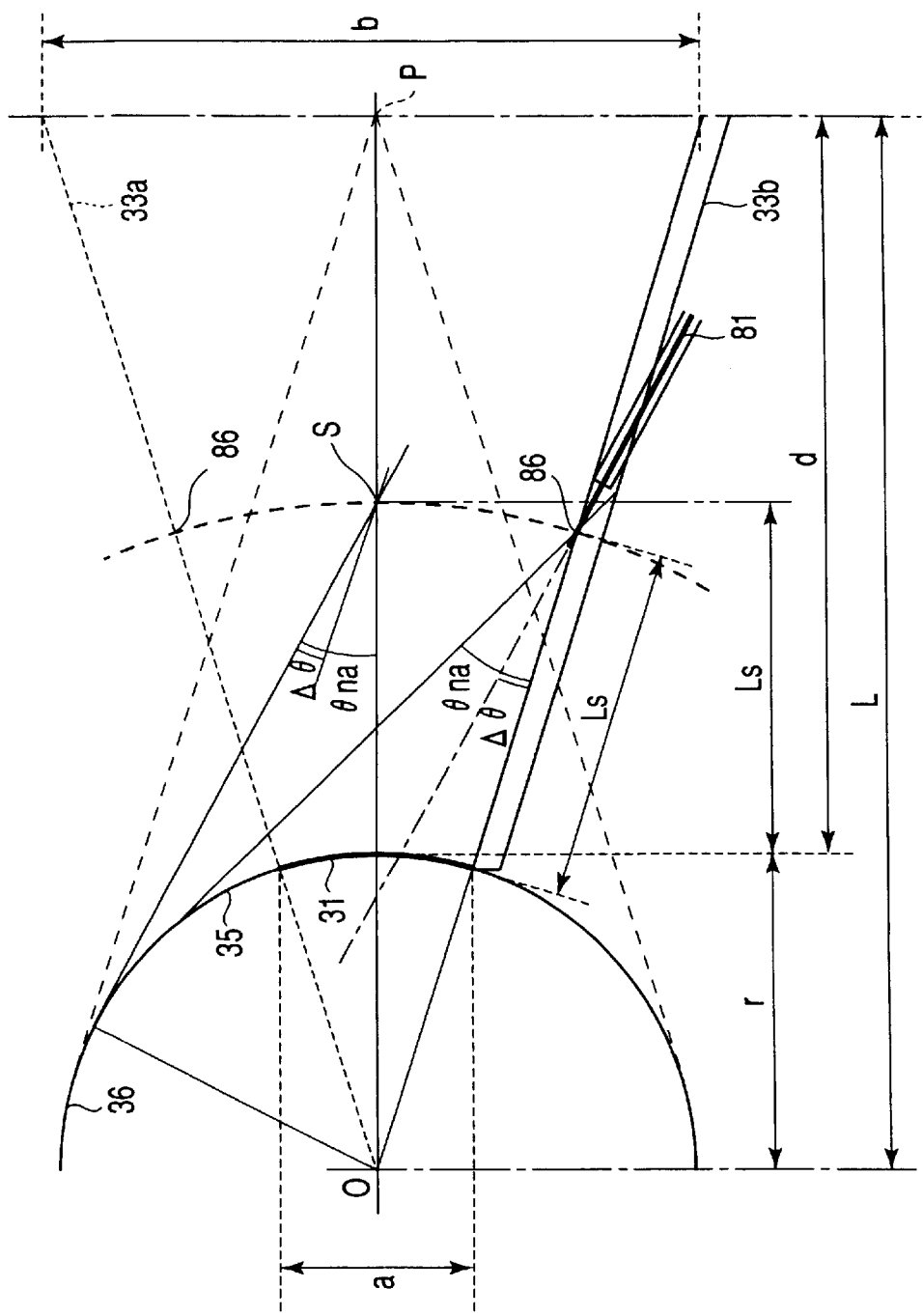
FIG. 17 is an explanatory view of another embodiment of the inventions.

As shown in FIG. 17, if the optical fiber 81 is inserted in the light integrator 33, the angle created by the axis of the incidence direction 81 at this position 86 and the inner surface of the light integrator 33 is expressed as $\Delta\theta$. The effective divergence angle of the light source light is expressed as $\Delta\theta$. In addition, the effective divergence angle of the light source light emitted from the optical fiber 81 is expressed as $\theta na$. Output light having a sum angle (divergence angle) which of a sum of the angle $\Delta\theta$ and the effective divergence angle $\theta na$ obtains a mirror image formed by the light integrator 33 and the diffusive reflection surface 31, i.e., the circle 36 having a radius r. In this case, the position S (=86) of the output light having the sum angle can be obtained as follows.

$$r = d \times (a/(b-a)) \tag{1}$$

The distance (r+Ls) from a cross-point O to an observation point S where the circle 36 is viewed as having the size of ($\Delta\theta+\theta na$) is as follows.

$$L \cdot \sin(\Delta\theta+\theta na) = r \tag{6}$$

Therefore, the following is obtained from the expressions (1) and (6).

$$L = a \cdot b \cdot \sin(\Delta\theta+\theta na)/(b-a) \tag{7}$$

Therefore, it should preferably be at the position as follows.

$$Ls = \{(ab)/(b-a)\}\{(1/\sin(\theta na+\Delta\downarrow))-1\} \tag{8}$$

In other words, an optimal incidence position exists on the surface S formed by a point at which the tangent to the circle having the radius (r+Ls) about the cross-point O as its center, as shown in FIG. 17, and a line extended from the cross-point O to the side of the light integrator 33 cross each other.

The core diameter of the optical fiber 81 is about several ten $\mu$ and is thus very small, so that an illumination device with high quality and without drawbacks can be provided in most cases as far as the position obtained from the expression (8) is not exceeded.

As described above, according to the present embodiment, an installation hole for installing the optical fiber 81 is provided at the intermediate position 86 of the light integrator 33. The work for forming the installation hole should be carried out carefully because the mirror part may be damaged. A method in which the installation hole is not provided will be a method of forming previously a hole when the light integrator 33 is shaped and manufactured. This method, however, involves a problem that stress easily occurs in the periphery of the hole and deformation easily occurs.

Another method in which the installation hole is not provided will be a method of inserting the optical fiber from the opening part of the light integrator 33 to the position where the distance Ls is obtained. However, if the optical fiber is inserted to the position indicated in FIG. 17, process for fixing the optical fiber is required, and as a result, the processing word involves difficulties.

To eliminate this complicated process, it is effective to use a relay lens so that the installation position of the optical fiber can be selected near the opening part of the light integrator 33.

Figures 18A, 18B, 18C:
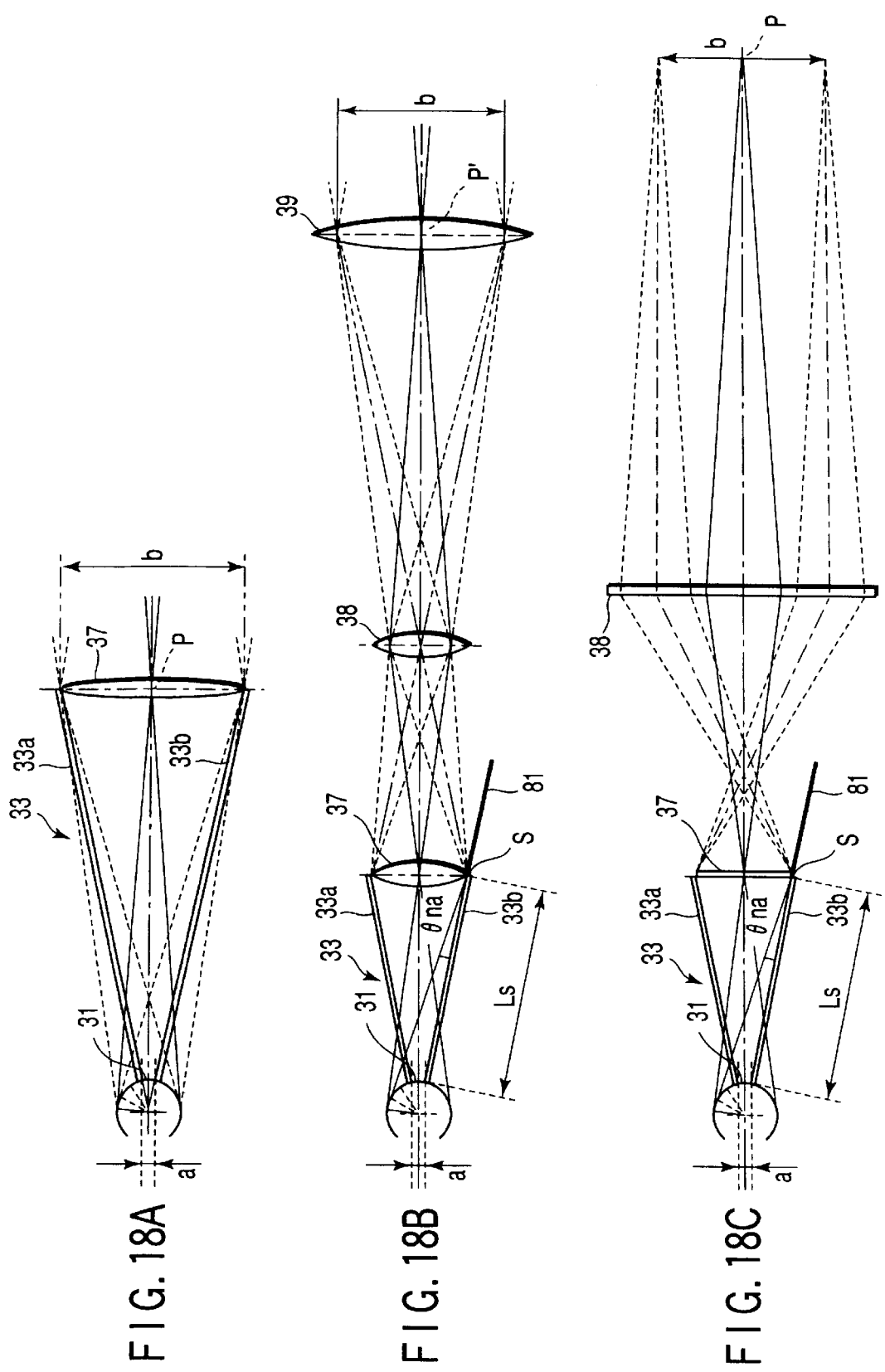
FIGS. 18A to 18C are views showing further another embodiment of the inventions.

FIGS. 18A to 18C shows an embodiment using a relay lens 37, 38, or 39. The same parts as those of the embodiments describe above are denoted at the same references.

In FIG. 18A, the reference 33 denotes a light integrator, the reference 31 denotes a diffusive reflection surface, and the reference 36 denotes a circle on which mirror images are formed. A relay lens 37 is attached to the opening part of this light integrator 33, and its optical axis is substantially aligned with the center axis of the light integrator 33. This illumination device is constructed so as to satisfy the expressions (1) to (5) described previously. If this condition is satisfied, the light integrator 33 may be cut at a position where the Ls described previously is satisfied, as shown in FIG. 18B or 18C. Further, illumination light thereof is optically coupled by the relay lens 37, 38, or 39 (FIG. 18B). The example shown in FIG. 18C shows a case of relay lenses 37 and 38 using micro lenses.

The position of the opening part of the light integrator 33 may be equal to the position at the distance Ls to the light-emission end of the optical fiber from the diffusive reflection surface 31. In this manner, installation and fixing of the optical fiber 81 is easy. This advantage has already been described with reference to FIG. 15.

As described above, in the illumination device according to the present invention, any type of induced-emission light source, including firstly a semiconductor laser, can achieve a projection-type projector at a low price and with a compact size and a high degree of freedom in design. In addition, necessities for special manufacture processes and manufacture equipments are reduced.

The claimed inventions are not limited to the embodiments described above.

With reference to the previous FIG. 13, explanation has been made as follows. "In practice, however, the light source and the mirror image are not smooth spheres but have polygonal shapes. Therefore, a shade depending on vertexes of a polygon (the range of the oblique lines 71 and 72 in the figure) are enlarged to an unignorable level particularly within a range in which the illumination distance is short. In this case, the difference is conspicuous between the observation point P which is not influenced from the ranges of the oblique lines 71 and 72 and an observation point Q which is influenced therefrom." As a countermeasure to improve this point, it has been explained that "the length d of the light integrator in the center axis direction is designed to fall within a range from 1.7 times the maximum diagonal of the area of the illumination setting range of a light valve to 6 times the maximum diagonal" with reference to FIG. 15.

However, where discussion is made again returning to FIG. 14A, the following can be pointed out. In FIG. 14A, the abscissa represents the value obtained by dividing the optical axis length d of the light integrator 33 by the illumination size b. Further, the figure shows analysis of the mirror setting angle and the number of observed mirror images. Based on the analysis, the maximum illumination angle characteristic at the optical axis observation point depending on the same parameter is shown in FIG. 14B. In this state, FIG. 14B shows the projection efficiency when the projection condition obtained from the expression (5) is set.

Figure 13:
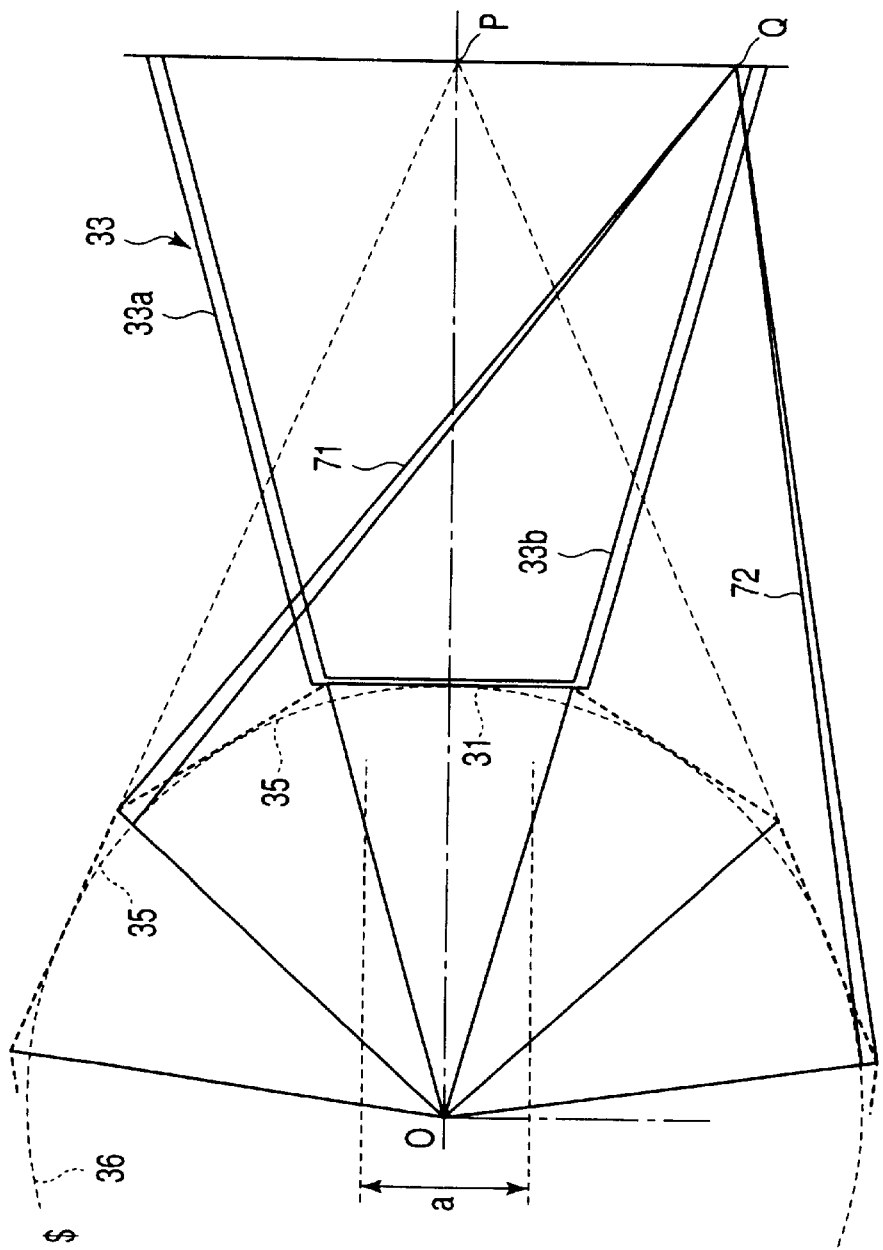
FIG. 13 is a view for explaining a problem of shade which appears in polygonal mirror images obtained by the light integrator.

If the observation point is shifted continuously from the observation point P to the point Q shown in FIG. 13, uneven illumination appears in correspondence with ripples in graphs shown in FIGS. 14B and 14C. To improve this, it is preferable to secure the illumination distance. Satisfaction of this requirement, however, sacrifices the purpose of cost reduction by reduction in volume occupation, size, and weight and downsizing of respective components.

Even if the sacrifice can be accepted, the light source passes through another mirror having a finite reflection efficiency every time when the number of mirror images increases by one, in view of the number of mirror images in FIG. 14B. Therefore, uneven illumination which can be estimated from graphs is as excellent as 1% if the illumination distance d which is five times greater than the illumination range is maintained by making a test calculation supposing that, for example, an aluminum-vapor-deposition mirror has a reflection factor of 95%. The number of mirror images, however, is eight, so that the eighth power of 95%, i.e., 34% is predicted as reflection loss.

This means that the illumination quality, shape, costs, and efficiency constitute a relation of trade-off between each other, and further modification is required to provide a projection-type display with a small size and a high efficiency at a lower price.

Further modifications can be made on the illumination device.

That is, in case of using a laser beam as a light source in the present invention, the light source range (diffusive reflection surface) obtained by the expression (5) is modified to obtain a light source range in which mirror images can be obtained in polygonal shapes and influence (uneven illumination) from their vertexes can be restricted. Therefore, the diffusive reflection surface is arranged to have a curvature so as not to receive the influence.

Also, in case where LED or the likes are arranged in a diffusive self-emission plate, a large number of light-emission elements are provided on an installation (board) surface having a curvature or a large number of light-emission elements are provided on a flat board, and the light-emission surface is processed into a shape having a curvature with use of arbitrary transparent resins or the like.

An illumination device on which the above improvement is made will now be explained below.

Figure 19:
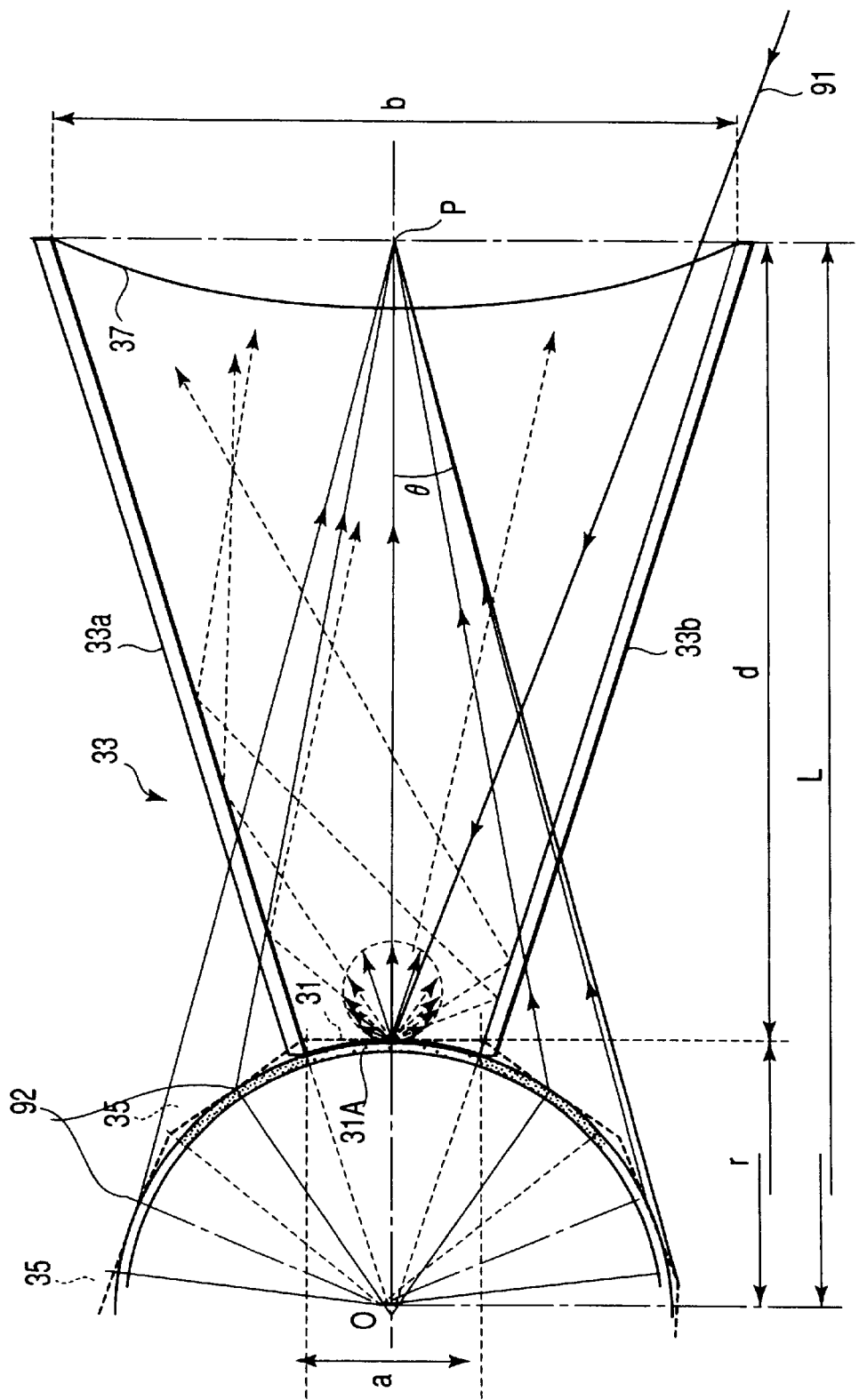
FIG. 19 is a view showing a basic structure of another embodiment of the inventions.

FIG. 19 shows a basic structure of the inventions. Explanation will be made with the same parts as those of the previous embodiments denoted at the same references. The space between the diffusive reflection surface 31 (having a size a) and an illumination setting range (having a size b) is surrounded by the light integrator 33. A convergence lens 37 whose focus point is the optical axis distance L from the opening part of the light integrator 33 to the cross-point O is provided at the opening part described above. In this illumination device, the relationship of the expression (5) described previously is satisfied.

A laser beam 91 is now irradiated on the optical axis position of the diffusive reflection surface 31 from an arbitrary position. The diffusive reflection surface 31 viewed from the illumination observation point P and its mirror images 35 are arranged on a sphere having a radius r which is determined by the expression (1) having its center on the cross-point O. As a result of this, it is observed as if a plurality of light sources existed toward the observation point P from centers 92 of polygonal ball created by the diffusive reflection surface 31 and the mirror images 35.

Even supposing a case where the position at which the laser beam 91 reaches the diffusive reflection surface 31 is shifted off due to installation errors and the like, an angle θ created when a line from a vertex of the polygonal shape and the optical axis cross each other at the observation point P is a maximum angle, and any angle created when a light beam from another position (excluding vertexes) of the mirror image and the light axis cross each other does not exceed the maxim angle. The angle θ can approximate to θ of the F-value which is determined by F=b/(2a) as long as the light integrator illumination distance d which is about twice the illumination range is securely maintained.

However, if the observation point P shifts, uneven illumination as explained with reference to FIG. 14 appears and becomes more conspicuous as the illumination distance d is shorter. Therefore, downsizing is difficult.

Hence, in the inventions, processing concerning the radius r determined by r=(a·b)/(b−a) is made on the diffusive reflection surface 31, so the diffusive reflection surface 31A and the mirror image thereof are changed into a sphere having the radius r.

Accordingly, the illumination efficiency is constant even in case where a sufficient illumination distance d cannot be obtained.

Further alternative arrangements are possible. The illumination angle depending on inclusion of a spherical surface increases in accordance with the illumination distance d although it is a slight increase. In this case, an ideal convergence factor cannot be maintained by the relationship determined by the expression (5).

Hence, in the inventions, a parameter with which the illumination efficiency is not degraded is calculated, even if a curved surface 31A is constructed by setting a spherical surface with respect to the diffusive reflection surface.

Figure 20:
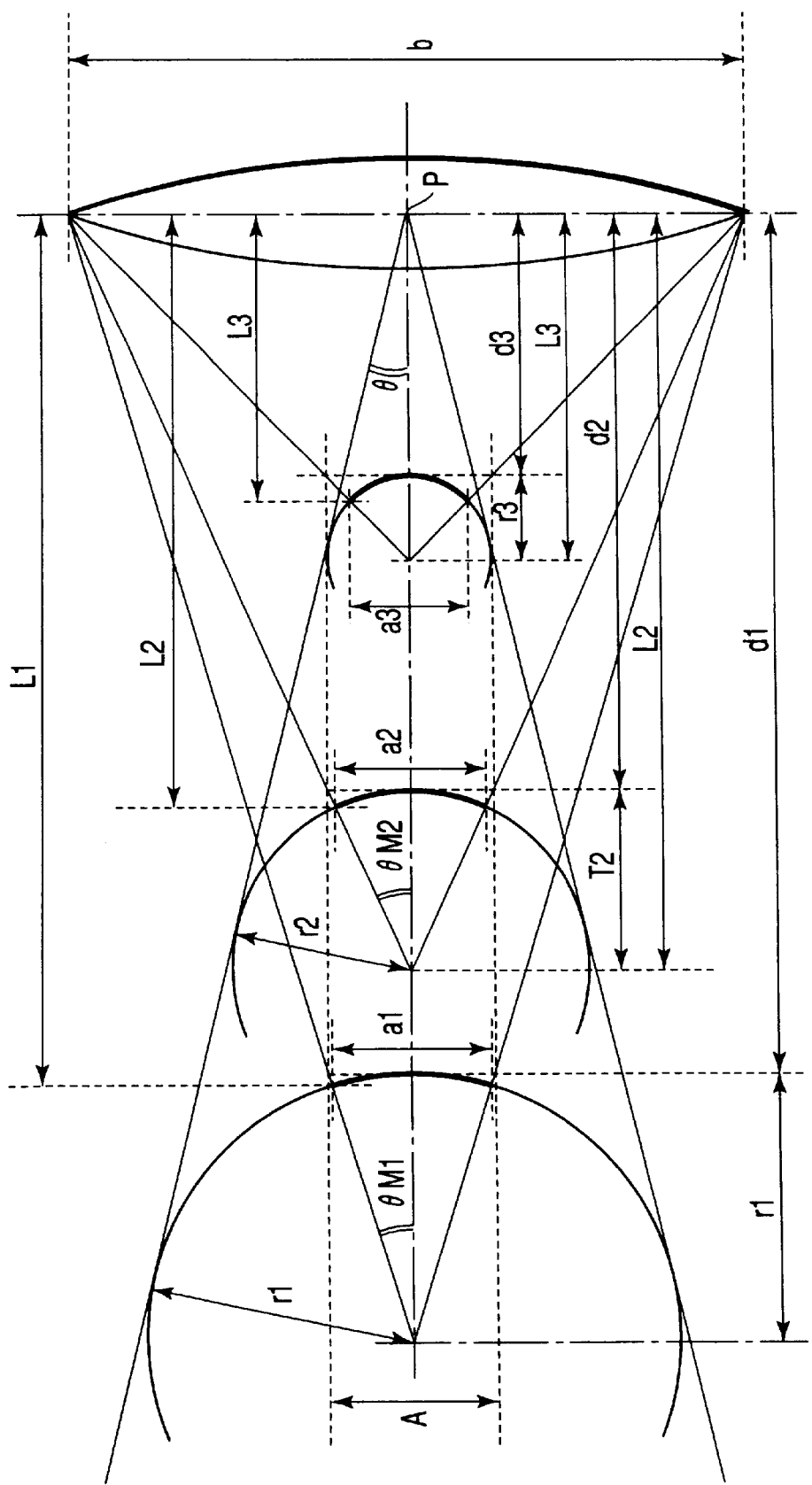
FIG. 20 is an explanatory view for an example of a design condition of the embodiment shown in FIG. 19.

Design conditions will be explained with reference to FIG. 20. Where the maximum illumination angle θ to the observation point P is constant, a radius of a sphere of a mirror image and a size of a reflection surface with which the convergence factor does not change (falls within the angle θ) with respect to the size A of the diffusive reflection surface 31 determined by the expression (5) gradually decrease as the illumination distance is shortened to L1, to L2, and further to L3. That is, as shown in the figure, when the distance is L1, the radius of the sphere on which mirror images are arranged is r1 and the size of the reflection surface is a1. When the distance is L2, the radius of the sphere on which mirror images are arranged is r2 and the size of the reflection surface is a2. When the distance is L3, the radius of the sphere on which mirror images are arranged is r3 and the size of the reflection surface is a3.

With use of parameters shown in FIG. 20, the relationship between them is obtained as follows.

$$\sin \theta = 1/(2 \cdot F) \tag{11}$$

$$r = (r+d)\sin \theta \tag{12}$$

Hence, the following is given.

$$r = d/(2 \cdot F - 1) \tag{13}$$

Where attention is paid to θM, the following is given.

$$\sin \theta M = a/(2 \cdot r) \tag{14}$$

$$\tan \theta M = (b-A)/(2 \cdot d) \tag{15}$$

Here, $$F = b/(2 \cdot A) \tag{16}$$

which is a condition of the light integrator is substituted to obtain the following.

$$\theta M = \tan^{-1}\{b \cdot (2 \cdot F - 1)/(4 \cdot d \cdot F)\} \tag{17}$$

The following is hence given.

$$a = \{2d/(2F-1)\}\sin[\tan^{-1}\{b \cdot (2 \cdot F - 1)/(4 \cdot d \cdot F)\}] \tag{18}$$

At this time, the expression (13) is directly applied to r, so the following is given.

$$r = d/(2 \cdot F - 1) \tag{13}$$

In addition, since the reflection surface has a curvature, the length L of the optical axis component of the light integrator then must extend from the distance d to the light integrator opening end part from the optical axis by the following gap component depending on the curvature.

$$r(1-\cos \theta M) \tag{19}$$

Therefore, the influence from the illumination light path length can be minimized, and an illumination optical system with high efficiency and high quality can be obtained by setting the following.

$$L = d + r[1-\cos[\tan^{-1}\{(b(2F-1))/(4dF)\}]] \tag{20}$$

If the invention as described above is applied to an illumination device, the influence from the length of the light integrator can be minimized so that illumination with high efficiency and high quality can be obtained, under an incidence light source condition of a semiconductor laser or the like which permits a spread to some extent. However, if a light source which has a very sharp directivity, such as a light source using a gas laser or the like, is incident to a position greatly distant from the optical axis, drawbacks occur particularly at an area where the illumination distance d is short.

This situation will be shown in FIG. 21 and explained below.

The same parts as those of the embodiments described above will be denoted at the same references. Suppose that the light integrator 33, diffusive reflection surface 31, illumination range b, and illumination distance d satisfy the condition described previously (expression 20). In this case, the angle between the optical axis and the light integrator is θM.

The diffusive reflection surface 31 and its mirror image 35 are arranged at an equal interval on a circle 36 having its center on the cross-point O, as has already been explained. To simplify the explanation, the mirror image will be explained, divided into areas p and q separated from each other by the optical axis as the boundary.

Suppose now that the diffusive reflection surface 31 is comprised of diffusive reflection surfaces 31$p$ and 31$q$. Then, the mirror images in the direction of the area p of the diffusive reflection surface 31$p$ must be arranged, for example, in the order of 36$p$ and 36$q$, at an angular interval of θM. The mirror image 36$p$ is a virtual image and cannot be observed from the observation point p.

Likewise, the mirror images of in the direction of the area q of the diffusive reflection surface 31$q$ must be arranged in the order of 36$q'$ and 36$p'$ at an angular interval of θM. However, the mirror image 36$p'$ is a false image and cannot be observed from the observation point p.

In this state, it is supposed that a light source 501 having excellent linearity as represented by a gas laser is inputted to the position (apart from the optical axis) 502 of the diffusive reflection surface. In this case, illumination light to the observation point P is at positions 503 and 504 where the diffusive light source can be observed, and the position 504 of them cannot be confirmed at the observation position.

As a result of this, the main light beam of the illumination light to the observation point which is the illumination position P is an average of the direct reflection light from the position 502 and the mirror-image reflection light from the position 503. In this case, the traveling axis of the illumination light is at an angle Θ to the optical axis and has a deviation which is an angle to the optical axis. This means that tele-centricity is lost.

Accordingly, in case where a liquid crystal light valve or the like which is easily influenced by the illumination range b is used, uneven contrast appears and illumination quality is degraded particularly when displaying black.

Hence, in the present invention, selection conditions for the angle θM is set as follows. That is, when the illumination setting maximum angle θ introduced from the illumination condition F and a product obtained by multiplying the previous angle θM generated from the relationship between the light integrator and the optical axis by an odd number (excluding 1) are added together, the angle θM is selected such that the addition result is 90 degree.

This effect will be explained with reference to FIG. 22.

FIG. 22 shows two light integrators 33-1 and 33-2.

These light integrators 33-1 and 33-2 are designed so as to satisfy the expression (20) described previously. Where the side of the diffusive reflection surface is observed from the observation point P, the diffusive reflection surface 31 is observed within a range of an angle θM at the center. Subsequently, primary mirror images 31A thereof are observed within a range of an angel 2θM. Further, secondary reflection images 31B are observed within a range of an angle 2θM.

If the angle θM is selected such that a line connecting the center O of the mirror images with a boundary between a N-th and N+1-th images (where N is 2 or more) crosses, at right angle, the maximum illumination angle range θ from the observation point P, the number of mirror images which can be observed from the observation point is correctly an odd number, in one area. That is, the range of the total mirror image in one area is an angle which is a product obtained by multiplying θM by an odd number.

Suppose that, for example, an incident light beam 511 reaches a diffusive reflection position 512 which is greatly shifted from the optical axis, at this time. in this case, the light beams which reach the observation point P are radiated from the diffusive reflection surface arrival position 512 viewed from the observation point P and corresponding positions 513 and 514 of respective mirror images. At this time, if the diffusive reflection surface 31' has a perfect diffusive reflection characteristic and the kaleido-mirror reflection efficiency is ideal, each of the light beams has an equal intensity, and the main light beam is equal to the light beam of the optical axis. This characteristic is not lost even if the observation position shifts from the optical axis. Although the situation of illumination to the observation position Q is described together, for example, the main light beam becomes parallel to the optical axis in this situation if a convergence lens not shown, whose focus point is r+d, is provided in the side of the opening of the light integrator.

In practice, due to a slight reflection loss and a deviation from perfect diffusion, a slight shift of the main light beam is predicted. However, influence of such a slight change can be negligible if sufficient mirror efficiency performance is ensured in the practical level.

From the above, an installation condition for a light integrator which can avoid changes of the main light beam to an arbitrary observation position is that the number of the mirror image is correctly an integer. That is, an illumination optical system which provides the smallest change of the main light beam can be constructed with respect to any type of light source if the deviation angle between the optical axis and the light integrator is set to an angle expressed below from the illumination maximum angle θ determined by the illumination condition F.

$$\Theta = (90-\theta)/(2 \cdot N - 1)$$

(where N is an integer of 2 or more excluding 1)

According to the inventions described above, a device at a low price with a compact size and a high degree of freedom in design can be obtained even with use of an induced-emission light source. In addition, a gas laser which requires highly precise installation of parts, an optical fiber which requires high techniques for installation, and the like can be easily combined with each other. Further, it is possible to obtain a device which hardly receives influences from changes of the main light beam, causes less uneven illumination, and attains a high convergence factor and high reliability. With respect to productivity, special investment or highly precise layout of parts is not required, and thus, the present invention is suitable for a projector apparatus with high quality and high efficiency.

Explained next will be another specific example of a structure of a projection-type display apparatus using the illumination device described above.

FIG. 23 shows an example in which an up-conversion laser device as explained previously and an illumination device using a light integrator are combined to realize a display apparatus.

The reference 600 denotes, for example, a prismatic optical fiber container casing, and a drum 601 standing on a bottom part in the direction toward a ceiling part is provided inside the casing 600. The clearance between the casing 600 and the drum 601 may be filled with a cooling medium 603 for cooling. Also, this cooling medium 603 may be forcedly circulated. It is preferable that an incombustible light-shielding material is used for the casing 600.

Semiconductor light sources 611, 612, and 613 are installed at an interval of 90 degree on surfaces of three corner parts of the casing 600, respectively. These semiconductor light sources 611, 612, and 613 may be in contact with the heat radiation processors 614, 615, and 616.

A light guide wave path 621 having an end attached to the semiconductor light source 611 is connected with an optical fiber 631, and this optical fiber 631 is guided around the drum 601 to the outside of the casing through a branch part 617. Likewise, another light guide wave path 622 having an end attached to the semiconductor light source 612 is connected with an optical fiber 632, and this optical fiber 632 is guided around the drum 601 to the outside of the casing 600 through the branch part 617. Also likewise, further anther light guide wave path 623 having an end attached to the semiconductor light source 613 is connected with an optical fiber 633, and this optical fiber 633 is guided around the drum 601 to the outside of the casing 600 through the branch part 617.

The optical fibers 631, 632, and 633 are extracted from an extraction port 604 of the casing 600, bundled by a protection coating film 605, and guided to an illumination device.

The optical fibers will now be explained below.

Each optical fiber is a light path (having a refraction factor N1) called a core and a coating (having a refraction factor N2) called a clad. Each optical fiber has a critical angle determined by $Q_R = \sin^{-1}(N1/N2)$ from the refraction factors. Light which exceeds the critical angle does not pass through the optical fiber but is lost halfway and thus does not reach the output end of the optical fiber. However, if the optical fiber is bent and installed at a arbitrary curvature under a installation space condition associated with downsizing of the projection-type display, light close to the critical angle falls within the critical angle firstly in the initial stage after the light enters into the optical fiber but incidence and reflection are repeated at arbitrary portions so that predetermined loss is caused from such light.

This loss varies depending on the material, bending curvature, thickness of the core, boundary condition of the core and clad, and the like.

Consequently, the radius of the drum is selected on condition that the loss described above can be reduced as much as possible when the radius of the drum is selected, and the structure is basically arranged such that the optical fibers are wound around the drum. In addition, heat generation is predicted in up-conversion. Therefore, it is preferred to adopt a structure which cools the entire of these parts.

Meanwhile, in case of light emission based on a laser, the efficiency is improved by square of the light density if an oscillation state is reached. Therefore, if an oscillation condition is satisfied, light emission based on time-divisional driving is effective. Explanation will hence be made of an apparatus more energy can be expected from lower power consumption in consideration of a light valve (DMD) according to a time-divisional driving system using a single plate.

In the up-conversion laser system explained previously, grading process is made on an optical fiber, and the structure is arranged so as to obtain resonance at an arbitrary wavelength, thereby to proceed induced emission. To make oscillation, an arbitrary light intensity is required, so that the optical fiber needs a core diameter of arbitrary thickness which satisfies this condition and realizes an incidence efficiency equal to or more than an arbitrary efficiency. However, after oscillation is once obtained, the conversion efficiency increases as the light density is higher. Therefore, the cross-sectional area of the up-conversion fiber should preferably be as narrow as possible. In other words, as long as the oscillation condition is satisfied, a greater light output can be obtained from a smaller electric power when light is emitted by sequential oscillation than when light is emitted by time-divisional driving (pulse driving). Accordingly, the laser response speed has such a high-speed responsibility that can be used for communication.

Therefore, the present system adopts a driving system as shown in FIGS. 24A to 24D, for example. FIGS. 24A and 24B are timing charts respectively showing a horizontal synchronization signal and a diving period. For example, a laser device which outputs light in color R operates for a ⅓ period of a horizontal period, and another laser device which outputs light in color G operates for a next ⅓ period. Further another laser device which outputs light in color B operates for a further next ⅓ period. At these timings, the light valve which irradiates a laser beam is supplied with R, G, and B video signals. A display apparatus is realized by repeating this operation.

However, in actual time-divisional driving, the ratio of light emission periods of the respective colors should preferably be adjusted as shown in FIG. 24C or 24D, so that an observer might not feel "color breakup".

FIG. 25 shows a state where light radiated from a light integrator 701 is further irradiated on the DMD 704 through a reflection mirror 702 and a relay lens 703, in the structure shown in FIG. 23. The figure also shows a state in which optical images reflected from the DMD 704 are introduced into the projection lens member 100. Optical fibers which output light of respective colors from the opening side to a diffusive reflection surface are introduced into the light integrator 701. The same parts as those shown in FIG. 23 are denoted at the same references.

Although various specific embodiments of the inventions have been described above, a alternative arrangements combining arbitrary ones of the embodiments also belongs to the scope of the present invention.

For example, a laser beam has been explained as being irradiated on the diffusive reflection surface 31. However, the diffusive reflection surface 31 may be a flat surface or a surface having a curvature. Further, the guide means which guides the laser beam may be arranged with its end part set at the opening part of the light integrator 33 or with its end part set more deeply than the opening part of the light integrator 33. Furthermore, the guide means may be introduced through a hole provided at a part of the body of the light integrator 33.

In addition, a structure in which light having a high efficiency other than a laser beam is irradiated on the diffusive reflection surface of the light integrator 33 also belongs to the scope of the present invention. Further, even a structure in which the diffusive reflection surface 31 has a curvature and a large number of light emission elements to emit light from itself belongs to the scope of the present invention. Furthermore, the scope of the present invention includes a structure in which a cooling medium or means is provided near or directly on an oscillation part which emits a laser beam. Also, the scope of the present invention includes a structure in which an optical fiber is wound around a drum to gain the distance (length) of the fiber and to realize an oscillation function and the output light therefrom is used as a light source of the light integrator.

As has been explained above, according to the present invention, it is possible to provide an illumination device for a projection-type display, which has a simple structure and a small size and is capable of obtaining a sufficient illumination light amount. Further, according to the present invention, it is possible to provide an illumination device for a projection-type display with improved illumination ability and high reliability. Also, according to the present invention, it is possible to provide an illumination device for a projection-type display with high performance at low costs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An illumination device for a projection-type display, comprising:

a light integrator having an irradiation surface opposed to a light valve and positioned in a side of light incidence part of the light valve such that a center axis of the irradiation surface substantially corresponds to an optical axis of the light valve, a diffusive reflection surface arranged at an interval from the irradiation surface, and a reflection mirror surrounding a space between the irradiation surface and the diffusive reflection surface, the light integrator having a cross-sectional area larger than the diffusive reflection surface at any position in the center axis direction; and a light source having light guide means for guiding light toward the diffusive reflection surface in the light integrator.

2. The device according to claim 1, wherein the light valve is an illumination system based on non-polarization control, and where a is a reflection area of the diffusive reflection surface and b is an area of a light valve illumination setting range depending on the irradiation surface, a relationship thereof with an F-value of light valve illumination determined by the light valve or a projection condition satisfies substantially $F=b/(2a)$, and the reflection area a of the diffusive reflection surface and the area b of the light valve illumination setting range are substantially similar to each other.

3. The device according to claim 1, wherein the light valve is an illumination system based on polarization control, where a is a reflection area of the diffusive reflection surface and b is an area of a light valve illumination setting range depending on the irradiation surface, a relationship thereof with an F-value of light valve illumination determined by the light valve or a projection condition satisfies substantially $F=b/(2a)$, and a polarization mirror which transmits a predetermined polarization axis component and reflection a polarization component perpendicular to the predetermined polarization axis component is provided on the irradiation surface.

4. The device according to claim 1, wherein the light valve is an illumination system based on polarization control, where a is a reflection area of the diffusive reflection surface and b is an area of a light valve illumination setting range depending on the irradiation surfaced, a relationship thereof with an F-value of light valve illumination determined by the light valve or a projection condition satisfies substantially $F=b/(2a)$, and $F=b/(4a)$ is substantially satisfied at a position of a cross-sectional surface perpendicular to the center axis.

5. The device according to claim 1, wherein a length d of the light integrator in the center axis direction is designed to fall within a range of 1.7 to 6 times a maximum diagonal of an area of an illumination setting range of the light valve.

6. The device according to claim 1, wherein the light source is induced-emission light including an up-conversion fiber laser, and the light guide means is an optical cable for guiding the induced-emission light.

7. An illumination device for a projection-type display, comprising:

a light integrator having an opening part, a diffusive reflection surface opposed to the opening part at an interval in an center axis direction of the opening part, and a reflection mirror surrounding a space between the opening part and the diffusive reflection surface, the light integrator having a cross-sectional area larger than the diffusive reflection surface at any position in the center axis direction; and a light source having light guide means for guiding light to enter into the diffusive reflection surface in the light integrator, substantially in parallel with the reflection mirror.

8. An illumination device for a projection-type display, comprising:

a light integrator having an opening part, a diffusive reflection surface opposed to the opening part at an interval in an center axis direction of the opening part, and a reflection mirror surrounding a space between the opening part and the diffusive reflection surface, the light integrator having a cross-sectional area larger than the diffusive reflection surface at any position in the center axis direction; and a light source having a fiber-like light guide means for irradiating light toward the diffusive reflection surface in the light integrator, substantially in parallel with the reflection mirror, wherein a position of a light emission end of the light guide means in the light integrator exists within a range in which a distance Ls to the light emission end from the diffusive reflection surface does not exceed a position given by $$Ls=\{(ad)/(b-a)\}\{(1/\sin(\theta na+\Delta\theta))-1\}$$

where $\Delta\theta$ is an insertion angle to a surface of the light integrator at an insertion position where the light guide means is inserted in the light integrator, $\theta na$ is an emission divergence angle determined by a material structure of the light guide means, a is a diffusive surface size in an internal cross-section of the light integrator including the insertion position of the light guide means and the center axis, b is a size of the opening part, and d is a light-axis parallel component length of the light integrator.

9. The device according to claim 8, wherein the distance d between the opening part and the diffusive reflection surface is substantially equal to the distance Ls, and the opening part and a light valve irradiation surface to which light emitted from the opening part is guided are coupled by a relay lens.

10. An illumination device for a projection-type display, comprising:

a light integrator having an irradiation surface opposed to a light valve and positioned in a side of light incidence part of the light valve such that a center axis of the irradiation surface substantially corresponds to an optical axis of the light valve, a diffusive reflection surface arranged at an interval from the irradiation surface, and a reflection mirror surrounding a space between the irradiation surface and the diffusive reflection surface, the light integrator having a cross-sectional area larger than the diffusive reflection surface at any position in the center axis direction; and a light source having light guide means for guiding light toward the diffusive reflection surface in the light integrator, wherein where a is a reflection area of the diffusive reflection surface, b is an area of a light valve illumination setting range depending on the irradiation surface, and d is a distance from the diffusive reflection surface to the irradiation surface, an F-value of the light valve illumination determined by the light valve or a projection condition satisfies substantially F=b/(2a), and the diffusive reflection surface has, as a curvature r thereof, a curvature substantially equal to r=(ad)/(b−a).

11. An illumination device for a projection-type display, comprising:

a light integrator having an irradiation surface opposed to a light valve and positioned in a side of light incidence part of the light valve such that a center axis of the irradiation surface substantially corresponds to an optical axis of the light valve, a diffusive reflection surface arranged at an interval from the irradiation surface, and a reflection mirror surrounding a space between the irradiation surface and the diffusive reflection surface, the light integrator having a cross-sectional area larger than the diffusive reflection surface at any position in the center axis direction; and a light source having light guide means for guiding light toward the diffusive reflection surface in the light integrator, wherein where a is a reflection area of the diffusive reflection surface, b is an area of a light valve illumination setting range depending on the irradiation surface, and d is a distance from the diffusive reflection surface to the irradiation surface, an F-value of light valve illumination determined by the light valve or a projection condition satisfies substantially F=b/(2a), the diffusive reflection surface has a curvature r, the reflection area a of the diffusive reflection surface having the curvature r has a component perpendicular to the optical axis expressed by $$a=[(2d)/(2F-1)]\sin[\tan^{-1}\{(b(2F-1))/(4dF)\}]$$

and has a curvature radius of r=d/(2F−1), and a condition expressed by $$L=d+r[1-\cos[\tan^{-1}\{(b(2F-1))/(4dF)\}]]$$

is substantially satisfied with respect to an optical axis component L of the light integrator.

12. The device according to claim 11, wherein a deviation angle θ between a center axis of the light integrator and a center route through which the light from the light guide means is irradiated and reflected on the diffusive reflection surface satisfies $$θ=(90-θ)/(2N-1)$$

(where N is an integer of 2 or more), where a is a size of a surface perpendicular to the center axis at a position of the diffusive reflection surface, θ is an illumination maximum angle determined by the illumination F-value determined by a projection lens or the like of the light valve.

13. An illumination device for a projection-type display, comprising a light integrator having an irradiation surface opposed to a light valve and positioned in a side of light incidence part of the light valve such that a center axis of the irradiation surface substantially corresponds to an optical axis of the light valve, a diffusive reflection surface arranged at an interval from the irradiation surface, and a reflection mirror surrounding a space between the irradiation surface and the diffusive reflection surface, the light integrator having a cross-sectional area larger than the diffusive reflection surface at any position in the center axis direction, wherein the diffusive reflection surface is formed as a diffusive reflection surface having a curvature at which the diffusive reflection surface is convex in a side of the irradiation surface.

14. The device according to claim 13, wherein the diffusive reflection surface has a plurality of light emission elements.

15. The device according to claim 13, further comprising light guide means for irradiating a laser beam on the diffusive reflection surface.

16. An illumination device for a projection-type display comprising:

a light integrator having an irradiation surface opposed to a light valve and positioned in a side of light incidence part of the light valve such that a center axis of the irradiation surface substantially corresponds to an optical axis of the light valve, a diffusive reflection surface arranged at an interval from the irradiation surface, and a reflection mirror surrounding a space between the irradiation surface and the diffusive reflection surface, the light integrator having a cross-sectional area larger than the diffusive reflection surface at any position in the center axis direction; and light guide means for irradiating a laser beam on the diffusive reflection surface in the light integrator.

17. An illumination device for a projection-type display in which one single light valve is irradiated with lights from a plurality of light sources respectively through light guide means, wherein each of the light guide means has an optical fiber or an up-conversion fiber which is wound around a drum contained in one single box, the drum has an arbitrary thickness and a diameter which exceeds a minimum radius determined by a defined NA of the optical fiber or up-conversion fiber, and positions where the light guide means are inserted into the one single box are on an extended line of a tangent to the drum, are provided at a plurality of portions, and are oriented in one same rotating direction.

18. The device according to the claim 17, wherein the light emitted from the light guide means is arranged so as to enter into the light integrator from vicinity of the opening part of the light integrator, the light integrator is constructed by the opening part, a diffusive reflection surface opposed to the opening part, and a reflection mirror surrounding a space between the opening part and the diffusive reflection surface, the diffusive reflection surface is expressed as a light-axis normal-line component a determined by a=b/(2*F) where b is a light valve illumination size in an arbitrary cross-section including an optical axis and F is an illumination F-value of the light valve, and the light from the light guide means is inputted in a direction in which an extensions direction cross-point of the reflection mirror appears.

19. The device according to claim 17, wherein the light valve uses a single-plate digital micro mirror device (DMD) in which a mirror is formed on a matrix and color display is performed by sub-field driving.

20. The device according to claim 17, wherein the light source include a light semiconductor element, and the light guide means has an up-conversion fiber and uses light having a shortest wavelength.

21. A projection-type display apparatus comprising:

a light valve;

a light integrator having an irradiation surface opposed to the light valve and positioned in a side of light incidence part of the light valve such that a center axis of the irradiation surface substantially corresponds to an optical axis of the light valve, a diffusive reflection surface arranged at an interval from the irradiation surface, and a reflection mirror surrounding a space between the irradiation surface and the diffusive reflection surface, the light integrator having a cross-sectional area larger than the diffusive reflection surface at any position in the center axis direction; and a light source having light guide means for guiding light toward the diffusive reflection surface in the light integrator.

22. A projection-type display apparatus comprising:

a light valve;

a light integrator having an irradiation surface opposed to the light valve and positioned in a side of light incidence part of the light valve such that a center axis of the irradiation surface substantially corresponds to an optical axis of the light valve, a diffusive reflection surface arranged at an interval from the irradiation surface, and a reflection mirror surrounding a space between the irradiation surface and the diffusive reflection surface, the light integrator having a cross-sectional area larger than the diffusive reflection surface at any position in the center axis direction; and light guide means for irradiating a laser beam toward the diffusive reflection surface in the light integrator.

23. A projection-type display in which one single light valve is irradiated with lights from a plurality of light spruces respectively through light guide means, wherein each of the light guide means has an optical fiber or an up-conversion fiber which is wound around a drum contained in one single box, the drum has an arbitrary thickness and a diameter which exceeds a minimum radius determined by a defined NA of the optical fiber or up-conversion fiber, and positions where the light guide means are inserted into the one single box are on an extended line of a tangent to the drum, are provided at a plurality of portions, and are oriented in one same rotating direction.

* * * * *